(12) United States Patent
Priestnall

(10) Patent No.: US 9,963,351 B2
(45) Date of Patent: May 8, 2018

(54) METHOD AND SYSTEM OF ACTIVATION OF MINERAL SILICATE MINERALS

(71) Applicant: CAMBRIDGE CARBON CAPTURE LTD, Cambridge (GB)

(72) Inventor: Michael Priestnall, Cambridge (GB)

( * ) Notice: Subject to any disclaimer, the term of this patent is extended or adjusted under 35 U.S.C. 154(b) by 92 days.

(21) Appl. No.: 15/303,208

(22) PCT Filed: Apr. 10, 2015

(86) PCT No.: PCT/EP2015/025018
§ 371 (c)(1),
(2) Date: Oct. 10, 2016

(87) PCT Pub. No.: WO2015/154887
PCT Pub. Date: Oct. 15, 2015

(65) Prior Publication Data
US 2017/0029284 A1 Feb. 2, 2017

(30) Foreign Application Priority Data

Apr. 10, 2014 (GB) .................................. 1406520.5

(51) Int. Cl.
| | |
|---|---|
| *C01F 5/22* | (2006.01) |
| *B01D 53/62* | (2006.01) |
| *B01D 53/80* | (2006.01) |
| *C01F 5/24* | (2006.01) |
| *C01F 11/12* | (2006.01) |
| *C01F 11/18* | (2006.01) |

(52) U.S. Cl.
CPC ............. *C01F 5/22* (2013.01); *B01D 53/62* (2013.01); *B01D 53/80* (2013.01); *C01F 5/24* (2013.01);
(Continued)

(58) Field of Classification Search
CPC .. C01F 5/22; C01F 11/18; C01F 11/12; C01F 5/24; B01D 53/80; B01D 53/62;
(Continued)

(56) References Cited

U.S. PATENT DOCUMENTS 4,708,640 A 11/1987 Honkaniemi et al.
5,624,493 A 4/1997 Wagh et al.
(Continued)

FOREIGN PATENT DOCUMENTS

| GB | 2515995 A | 1/2015 |
|---|---|---|
| GB | 2516141 B | 10/2016 |
| WO | 2015/154887 A1 | 10/2015 |

OTHER PUBLICATIONS

Zevenhoven et al., "Carbon dioxide mineralisation and integration with flue gas desulfurisation applied to a modern coal fired power plant," Proceedings of ECOS 2012—Jun. 26-29, 2012, Perugia, Italy. (Year: 2012).*

(Continued)

*Primary Examiner* — Anthony J Zimmer

(57) ABSTRACT

A method for activation of magnesium silicate minerals by conversion to magnesium hydroxide for sequestration of carbon dioxide ($CO_2$) is provided. The method includes heating a dry solid-solid mixture of an alkaline earth Silicate-based material with an alkali metal compound at a temperature below 300 C to form a solid product predominantly comprising a mixture of magnesium hydroxide and alkali metal silicate, wherein the Silicate-based material comprises a naturally occurring Olivine, Serpentine mineral and alkali metal silicate. The method includes a subsequent dissolution of the solid product in aqueous solution to form an alkaline aqueous liquid slurry, comprising solid and aqueous phase products and the reaction of the solid phase thus formed with Carbon Dioxide ($CO_2$), producing a metal Carbonate. The method provides a process that has shown significant cost and energy efficiencies for producing magnesium hydroxide and $CO_2$ sequestration via mineral carbonation.

14 Claims, 16 Drawing Sheets

(52) U.S. Cl.
CPC ............. *C01F 11/12* (2013.01); *C01F 11/18* (2013.01); *B01D 2251/304* (2013.01); *B01D 2251/402* (2013.01); *B01D 2251/404* (2013.01); *B01D 2251/604* (2013.01); *B01D 2257/504* (2013.01); *B01D 2258/0283* (2013.01); *B01D 2259/126* (2013.01); *C01P 2002/72* (2013.01); *C01P 2002/88* (2013.01); *Y02C 10/04* (2013.01); *Y02P 20/152* (2015.11)

(58) Field of Classification Search
CPC ........ B01D 2251/304; B01D 2259/126; B01D 2257/504; B01D 2251/604; B01D 2258/0283; B01D 2251/402; B01D 2251/404; Y02C 10/04; Y02P 20/152; C01P 2002/88; C01P 2002/72
See application file for complete search history.

(56) References Cited

U.S. PATENT DOCUMENTS

| | | | |
|---|---|---|---|
| 8,114,374 | B2 | 2/2012 | Blencoe et al. |
| 2004/0213705 | A1 | 10/2004 | Blencoe et al. |
| 2012/0288431 | A1 | 11/2012 | Chizmeshya et al. |
| 2013/0036948 | A1 | 2/2013 | Fernandez et al. |
| 2015/0368154 | A1* | 12/2015 | Gartner ............... C01F 5/16 423/164 |

OTHER PUBLICATIONS

Combined Search and Examination Report received for the United Kingdom Patent Application No. GB1306559.4, dated Oct. 7, 2013, 6 pages.
Combined Search and Examination Report received for the United Kingdom Patent Application No. GB1406520.5, dated Nov. 11, 2014, 5 pages.
Examination Report received for the United Kingdom Patent Application No. GB1406520.5, dated Mar. 21, 2016, 2 pages.
International Search Report and Written Opinion received for International Patent Application No. PCT/EP2015/025018, dated Jul. 31, 2015, 10 pages.
Zevenhoven, Ron, et al., "Carbon Storage by Mineralisation (CSM): Serpentinite Rock Carbonation via Mg(OH)2 Reaction Intermediate without CO2 Pre-Separation", Energy Procedia, Proceedings of the 11th International Conference on Greenhouse Gas Control Technologies GHGT-11, vol. 37, Dec. 2013, pp. 5945-5954.

* cited by examiner $$Mg_2SiO_4 + 2OH^- + H_2O \Longrightarrow 2Mg(OH)_2 + SiO_3^{2-}$$

$$SiO_3^{2-} + 2HCO_3^- \Longleftrightarrow 2CO_3^{2-} + SiO_2\ (ppt) + H_2O$$

METHOD AND SYSTEM OF ACTIVATION OF MINERAL SILICATE MINERALS

TECHNICAL FIELD

The present disclosure relates to methods of producing activated mineral silicate for use in sequestrating Carbon Dioxide, for example from flue-gas, by utilizing a process which involves digestion of metal mineral Silicates. Moreover, the present disclosure also relates to systems for executing aforesaid methods.

BACKGROUND

Increasing concentrations of Carbon Dioxide ($CO_2$) in the Earth's atmosphere have recently caused concerns, as the present concentrations are substantial at 400 p.p.m. and increasing at a rate of 4 p.p.m. per annum. A major factor contributing to such increase is the anthropogenic oxidation of carbonaceous fossil fuels, for example coal, oil and gas. The World presently consumes circa 100 million barrels of oil per day.

There have been recent initiatives to employ more renewable energy systems, for example wind turbines and tidal power generating systems, as well as sequestration of Carbon Dioxide ($CO_2$) from flue-gases emitted from coal-burning electricity generating facilities. Thus, primary initiatives involve utilizing energy efficient technologies, increasing reliance on renewable sources, and developing technologies for long term storage of Carbon Dioxide ($CO_2$) emissions. The latter technology field is known as Carbon Dioxide ($CO_2$) sequestration.

There have been significant developments in Carbon Dioxide ($CO_2$) sequestration in recent years, and Carbon Dioxide sequestration technologies have aroused considerable interest among governments, industries and scientific communities. Earlier methods of Carbon Dioxide ($CO_2$) sequestration suffered from various drawbacks such as risk of water contamination, and a lack of suitable storage spaces for receiving sequestrated Carbon Dioxide ($CO_2$); these drawbacks are familiar to a person skilled in the art.

There has been considerable interest in mineral Carbonation technologies to address aforementioned problems associated with known Carbon Dioxide ($CO_2$) sequestration. A Masters thesis by Mabell Delgado Torróntegui at ETH in Switzerland, "*Assessing the Mineral carbonation science and technology*" (2010), provides an overview of contemporary research in this field of Carbon Dioxide ($CO_2$) sequestration technology. A key principle of mineral Carbonation is also known as "mineral sequestration technology", wherein sequestration of Carbon Dioxide ($CO_2$) is achieved by capturing Carbon Dioxide ($CO_2$) in a form of stable mineral Carbonates. Such sequestration employs a process which is an exothermic reaction of a metal Oxide and Carbon Dioxide ($CO_2$) to form stable Carbonate materials as provided in a reaction formula (1):

$$MO + CO_2 => MCO_3 + Heat \quad (1)$$

wherein M is a metal, preferably an alkaline earth metal such as Calcium or Magnesium.

Most suitable and naturally abundant sources of these metal Oxides are Magnesium or Calcium Silicate minerals such as Olivine, Wollastonite, and Serpentine. The Carbonation reactions of these minerals are as follows:

Olivine:

$$Mg_2SiO_4 + 2CO_2 => 2MgCO_3 + SiO_2 + 89 \text{ kJ mol-1 } CO_2 \quad (2)$$

Serpentine:

$$Mg_3Si_2O_5(OH)_4 + 3CO_2 => 3MgCO_3 + 2SiO_2 + 2H_2O + 64 \text{ kJ mol-1 } CO_2 \quad (3)$$

Wollastonite:

$$CaSiO_3 + CO_2 => CaCO_3 + SiO_2 + 90 \text{ kJ mol-1 } CO_2 \quad (4)$$

Although the above reactions (2) to (4) are thermodynamically favourable, the reactions in nature have, however, relatively slow reaction rates in a geologic time scale, and are unsuitable for industrial processes. Efforts have been made to try to accelerate these reactions. However, the efforts suffer from various limitations, such as energy wastage and a high cost of mining and transporting large amounts of rock, as well as industrial and environmental inefficiencies. Moreover, the mineral Silicates are not easily obtainable in suitable quantities and formats for allowing satisfactory mineral Carbonation to be achieved.

In a published U.S. Pat. No. 5,604,787B2 (MAROTO-VALER), "Process for sequestering Carbon Dioxide and Sulphur Dioxide", there is described a method of reacting a Silicate-based material with an acid to form a suspension, which is then combined with Carbon Dioxide to produce a metal salt, silica and regenerating acid in solution. This method has drawbacks of being environmentally harsh and inefficient. Moreover, similar problems with the approach are described in US patent application 2004126192A1 (SHELL INTERNATIONAL RESEARCH), "Process for Removal and Capture of Carbon Dioxide from Flue Gases".

Although, the prior art disclosures have been able to address some of the problems of mineral Carbonation through their indirect sequestration processes, there are several remaining problems which have not yet been resolved. Such remaining problems pertain to industrial scalability, environmental efficiency, and cost.

Lately, research effort has focused upon Carbon Dioxide ($CO_2$) sequestration by 'direct' Carbonation of Olivine or Serpentine. In these recent methods, Carbon Dioxide ($CO_2$) is sequestered without acid pre-treatment of Silicate feedstock. An Olivine reaction is:

$$Mg_2SiO_4 + 2CO_2 \rightarrow 2MgCO_3 + SiO_2 \quad (5)$$

Moreover, for Serpentine, a corresponding reaction is:

$$Mg_3Si_2O_5(OH)_4 + 3CO_2 \rightarrow 3MgCO_3 + 2SiO_2 + 2H_2O \quad (6)$$

Experiments to determine the kinetics of these reactions (5) and (6) have shown that such reactions also suffer from poor energy efficiency and a high cost when up-scaled to an industrial plant. In order to accelerate the reactions (5) and (6), high temperatures in a range of 600° C. to 650° C. are required. In a fuel-fired industrial power plant, attainment of such high temperatures would translate to a requirement of approximately 200 kW-h of electricity per tonne of Serpentine feedstock. Moreover, with a fossil fuel containing 1 tonne of Carbon, nearly 3.7 tonnes of Carbon Dioxide ($CO_2$) is produced. Each tonne of Carbon Dioxide ($CO_2$) consumes more than 2 tonnes of Serpentine during Carbonation. Combined with a pre-capture step to separate and pressurise CO2 from flue gas, the power required for Serpentine dehydroxylation is around 20-30% of total power output from such fuel-fired industrial power plant. All these considerations lead to a huge energy penalty threatening the economic feasibility of this sequestration process.

In a published U.S. Pat. No. 8,114,374B2 (BLENCOE), "Carbonation of metal Silicates for long-term $CO_2$ sequestration", there is described a method (hereinafter "Blencoe's method") of reacting a Silicate with an alkali metal hydroxide in an aqueous solution. The reaction with Carbon Dioxide ($CO_2$) is then used to carbonate the metal formerly contained in the metal Silicate. This method has drawbacks of inefficiencies and poor overall Carbon capture properties. Blencoe's method comprises three steps:

(1) reacting a metal silicate with a caustic alkali-metal hydroxide to produce a hydroxide of the metal formerly contained in the silicate;
(2) reacting carbon dioxide with at least one of a caustic alkali-metal hydroxide and an alkali-metal silicate to produce at least one of an alkali-metal carbonate and an alkali-metal bicarbonate; and
(3) reacting the metal hydroxide product of step (a) with at least one of the alkali-metal carbonate and the alkali-metal bicarbonate produced in step (b) to produce a carbonate of the metal formerly contained in the metal silicate of step (a).

In Blencoe's first step (1), the alkali-metal hydroxide is in aqueous solution which limits the maximum reaction temperature to the vapour pressure of the aqueous solution at the pressure under which the reaction is carried out. A low reaction temperature limits the reaction rate at atmospheric pressure, while use of a pressurised vessel increases process costs. Alkali-metal hydroxides, such as NaOH and KOH, used in steps (1) and (2) are energy-intensive and expensive chemicals to manufacture. In Blencoe's second step (1), alkali-metal hydroxide, additional to that used in step (1), is used to react with Carbon Dioxide. In Blencoe's second and third steps (2) and (3), an elevated pressure is required, namely having implied costs of a pressure vessel, in the range between the vapour pressure of water at the reaction temperature and 50 Bar. It is doubtful that the overall process described is able to sequester more Carbon Dioxide as a metal carbonate than is generated as a consequence of manufacture of the alkali-metal hydroxides consumed in the process, or that the process is any cheaper to operate than Carbon Dioxide sequestration processes described in the prior art.

Therefore there is an urgent need to develop a process which is energy efficient, has a high throughput and is more cost effective than the prior art so that it can be used industrially.

From the foregoing, it will be appreciated that the known methods of processing and the systems for mineral Carbonation and Carbon Dioxide ($CO_2$) sequestration, are neither optimal in their manner of operation nor adaptable to broader applications in a cost effective manner.

SUMMARY

The present invention seeks to provide an improved method of activation of magnesium silicate minerals by conversion to magnesium hydroxide.

This present embodiment of the invention allows for a method of large scale industrial use and continuous carbonation without advanced pressure chambers or equipment.

In an embodiment of the present invention a method for activation of magnesium silicate minerals by conversion to magnesium hydroxide is provided, which method comprising:

a. mixing a dry powder of magnesium silicate rock with a dry powder of alkali metal compound to form a dry solid-solid mixture with a molar ratio in the range of 1-3 moles of alkali metal per mole of silicon in the mixture;

b. heating the dry solid-solid mixture to a temperature below 300 C in an unpressurised vessel for less than 4 hours to form a solid glass product predominantly comprising a mixture of magnesium hydroxide and alkali metal silicate; and c. dissolution of the solid glass product in aqueous solution to form an alkaline aqueous liquid slurry, comprising solid and aqueous phase products.

Optionally, an embodiment of the method includes the liquid slurry of step c being separated into solid and aqueous solution phase products.

Optionally, an embodiment of the method includes reacting any of the aqueous phases at atmospheric pressure with a gas comprising 0.04%-100% $CO_2$.

Optionally, an embodiment of the method includes mixing the solid phase product with water and reacted at atmospheric pressure with a gas comprising 0.04%-100% $CO_2$.

Optionally, an embodiment of the method includes air or flue gas as the gas in the reaction. This allows for a very simple and cost effective solution utilizing what is available at the site of operation.

Optionally, an embodiment of the method includes using a hydroxide or a carbonate of sodium or a potassium as the alkali metal compound in the reaction.

Optionally, an embodiment of the method includes a serpentine or an olivine rock as the magnesium silicate mineral in the reaction. Further optionally the method includes heating the unpressurised vessel in step (b) to a temperature in the range 140 C-220 C.

Optionally, an embodiment of the method as claimed in claim 1, characterized in that the method includes continuously adding the magnesium silicate mineral and alkali metal compound of step (a) together allowing continuous reacting thereof under the conditions of step (b) and further continuously removing the product of step (b).

Optionally, an embodiment of the method includes the molar ratio of substantially 2 moles of alkali metal per mole of silicon in the mixture.

In accordance with a second aspect of the present invention, an embodiment seeks to provide a system for activation of magnesium silicate minerals by conversion to magnesium hydroxide; wherein the system includes a first reaction chamber which is operable to receive a Silicate-based material and an alkaline compound, and a blending apparatus for blending contents of the first reaction chamber to produce a mixture therein as claimed in any of the preceding method above.

Optionally, an embodiment of the invention includes a system for activation of magnesium silicate minerals by conversion to magnesium hydroxide, wherein the system is operable to execute sequestration by Carbon Dioxide ($CO_2$).

In accordance with a third aspect of the present invention, an embodiment seeks to provide an improved method of sequestrating Carbon Dioxide ($CO_2$).

The further embodiment of the invention also seeks to provide a system for sequestrating Carbon Dioxide ($CO_2$).

In one more aspect, embodiments of the present invention provide a method of sequestrating Carbon Dioxide ($CO_2$) which comprises:

(a) reacting an alkaline earth silicate-based material with an alkali metal compound to form a mixture comprising a hydroxide of the alkaline earth, wherein the alkali metal is selected from sodium and/or potassium, and wherein the alkaline earth is selected from magnesium and/or calcium; and preferably wherein no water is added to the reaction mixture and no more than two moles of alkali-metal (in the alkali-metal compound) are added per mole of silicon (in the alkaline earth silicate).

(b) reacting the mixture at a temperature in the range of 140-220° C. and at a pressure of less than 10 bar; and preferably at ambient atmospheric pressure (c) separating the hydroxide of the alkaline earth from the mixture; and (d) combining the hydroxide of the alkaline earth with a source of Carbon Dioxide ($CO_2$) producing a Carbonate or Bicarbonate or the alkaline earth; and wherein the carbon dioxide is part of a gas mixture at ambient atmospheric pressure.

Optionally, the method includes reacting the mixture in (b) at a pressure of less than the vapour pressure of water at the temperature of reaction, for example at ambient atmospheric pressure. This allows for a capacity for large scale industrial use and continuous carbonation without advanced pressure chambers or equipment.

Optionally, the mixture is in a stoichiometric molar ratio between Si in the Silicate-based material and the alkali metal in the alkaline compound in a range of 1:1 to 1:2.

Optionally, the mixture is in a form of an aqueous solution with the molality of >30 molar of alkaline compound per liter water ($H_2O$).

Optionally, that the method includes using flue gases with less than 50 vol % Carbon Dioxide ($CO_2$) as part of a gas mixture for carbonation.

In accordance with an embodiment of the present invention, the reaction of the mixture is executed at an ambient pressure and at a reaction temperature of circa 180° C. This has significant benefit over disclosed prior art. The Carbonation of Silicates is an exothermic reaction, but kinetically slow, which requires high energy consuming conditions, thus influencing costs and environmental impact of the reaction. By operating at an elevated temperature, the reaction of the mixture occurs much more efficiently, more economically and thus more favourably for practical industrial applications.

In accordance with an embodiment of the present invention, an alkaline compound, Sodium Hydroxide, is optionally used while executing the method, thereby providing significant improvement over prior art, and using the alkaline compound in a much more economical and efficient manner.

In accordance with any of the earlier embodiments, the method includes carrying out reactions in an unpressurised continuous mode to achieve substantially complete conversion of Magnesium Silicate to Magnesium Hydroxide, and carbonation of Magnesium Hydroxide.

In yet another aspect, embodiments of the present invention provide a system for sequestrating Carbon Dioxide ($CO_2$), wherein a first reaction chamber is arranged to receive a Silicate-based material and an alkaline compound, wherein a blending arrangement is provided for the first reaction chamber to produce a mixture of the Silicate-based material and the alkaline compound therein.

Embodiments of the present invention substantially eliminate the aforementioned problems in the prior art, wherein:

(i) higher pH values favour the Carbonation reaction in an unpressurized vessel;

(ii) a very small amount, namely molar ratio of $H_2O$:$Mg_2SiO_4$=0:2, of water and minimization, namely molar ratio of NaOH:$Mg_2SiO_4$=1:4, and a very small amount of the Sodium Hydroxide (NaOH) is required to avoid a need to recover excess Sodium Hydroxide (NaOH), thereby avoiding excess consumption of reactants; and (iii) an excess consumption of acid to precipitate Silica is avoided, thereby enabling an efficient and cost-effective method and system of sequestrating Carbon Dioxide ($CO_2$) to be achieved, by way of digestion of metal mineral Silicates.

Additional aspects, advantages, features and objects of the present invention would be made apparent from the drawings and the detailed description of the illustrative embodiments construed in conjunction with the appended claims that follow. It will be appreciated that features of the present invention are susceptible to being combined in various combinations from different embodiments without departing from the scope of the present invention as defined by the appended claims.

DESCRIPTION OF DRAWINGS

The summary above, as well as the following detailed description of illustrative embodiments, is better understood when read in conjunction with the appended drawings. For the purpose of illustrating the present invention, exemplary constructions of the disclosure are shown in the drawings. However, the present invention is not limited to specific methods and apparatus disclosed herein. Moreover, those in the art will understand that the drawings are not to scale. Wherever possible, like elements have been indicated by identical numbers.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented.

Figure 1:
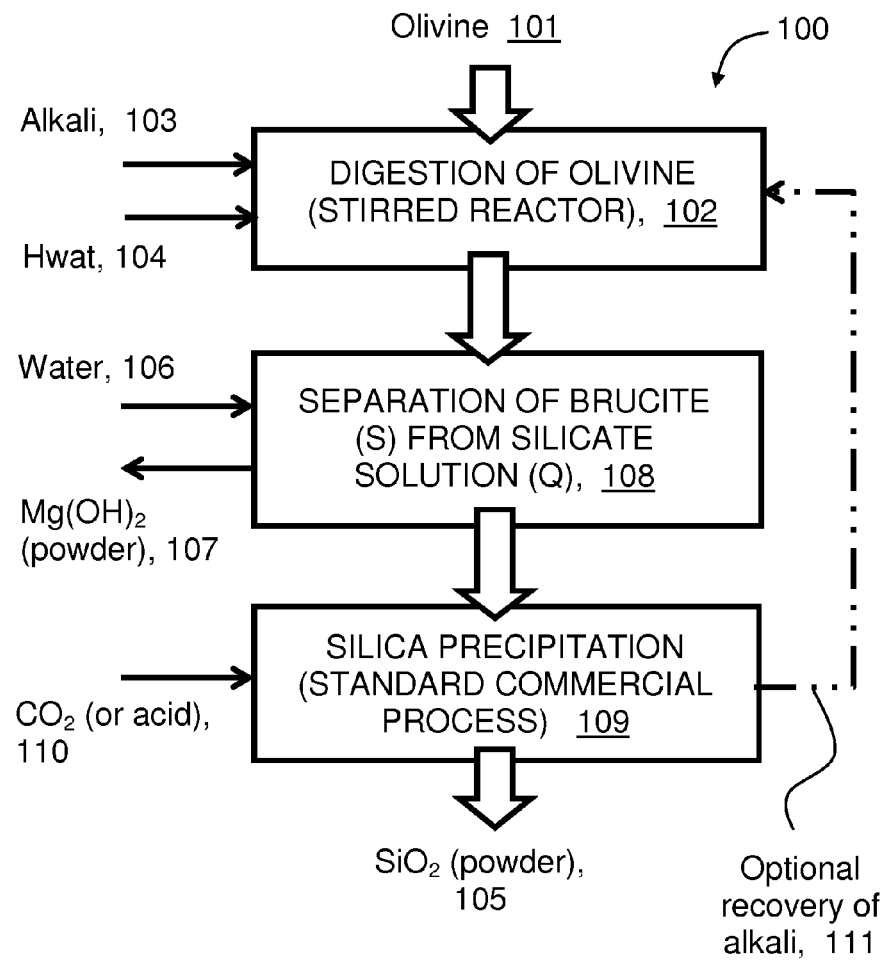
FIG. 1 is an illustration of a flow chart of a digestion Step 1 involving alkaline digestion of Serpentine or Olivine to convert them to Brucite and Silica.

In FIG. 1, there is shown an embodiment of digestion system and process 100, wherein there occurs alkaline digestion of a Silicate-based material, preferably an alkaline earth silicate and more specifically a naturally occurring feedstock containing magnesium or calcium silicate, such as Serpentine, Olivine, Dunite, and/or Wollastonite 101. The process 100 results in reaction products being generated, namely a conversion to Brucite and Silica in a case of Olivine 101 being a feed mineral employed. In the reaction, Olivine 101 is fed into a stirred reactor 102 together with an alkali 103 and heat is provided from a heat source 104. The alkali is beneficially selected from a mineral Hydroxide. Among the many metal Hydroxides that can find utility in this reaction, a preferable alkali used is Sodium Hydroxide (NaOH).

According to one of the embodiments, the reaction mixture of the digestion process 100 comprises a stoichiometric ratio between the soluble silicate-based material and the solid hydroxide of the alkaline earth compound of about 1:2. This stoichiometric ratio aims to minimise the input of the alkaline compound, such as Sodium Hydroxide (NAOH), into the initial reaction mixture. This limits the regeneration of Sodium Hydroxide (NaOH) from carbonates at the end of the reaction, which is costly and time consuming. The reaction mixture is preferably in an aqueous solution during reaction, but it would favourably also be in a non-aqueous mixture.

According to a further embodiment, the reaction mixture is a solid-state dry mixture of a powder of the alkaline-earth silicate and the alkali-metal compound, in the stoichiometric ratio of one mole of silicon, namely in the silicate, per two moles of alkali-metal. Solid alkali-metal compounds, such as NaOH, KOH and $Na_2CO_3$, have high melting points, namely 318° C., 406° C. and 851° C., respectively. Using an aqueous system, such as taught by Blencoe, would therefore be expected to be essential to achieving mixing and reaction at temperatures below 300° C. Surprisingly, in experiments using NaOH and Serpentine, namely magnesium silicate, it is found that a dry solid-state mixture of the two rapidly melted, mixed and reacted to form magnesium hydroxide in an unpressurised vessel at temperatures as low as 180° C., namely well below the melting temperature of NaOH, namely 318° C., or of Serpentine, namely >1700° C. Unlike Olivine, Serpentine has a crystal structure that contains chemically bound hydroxide groups, and it is believed that these groups may facilitate the dry stoichiometric reaction to form magnesium hydroxide.

Dunite can also be used to yield $Mg(OH)_2$ via solid state reaction, with a preferable ratio of Dunite to NaOH in a mole ratio of 1:2, at a temperature around 180° C. Experiments conducted with a range of Dunite:NaOH mole ratios of 1:0.5, 1:1, 1:0.5 and 1:2, where the powder has been formed into pellets by compaction with a hand press (3 tonnes for 1 minute for compression), returned results indicating a linear increase of $Mg(OH)_2$ production with increase of NaOH, to a maximum weight percentage of $Mg(OH)_2$ in the reaction products of around 46.7%. Reducing the amount of NaOH significantly lowered the extraction efficiency of the process. For experiments comprising Dunite, where the NaOH was mixed in a mole ratio of 1:4 with $H_2O$ (e.g. 1:2:0.5 Dunite: $NaOH:H_2O$), the $H_2O$ enhanced the effect of the formation of magnesium hydroxide for higher mole ratios of Dunite: NaOH, namely 1:2 and 1:1.5. In particular, a weight percentage of $Mg(OH)_2$ of around 54% of reaction products was achieved for a Dunite to NaOH ratio of 1:2.

Figure 3A:
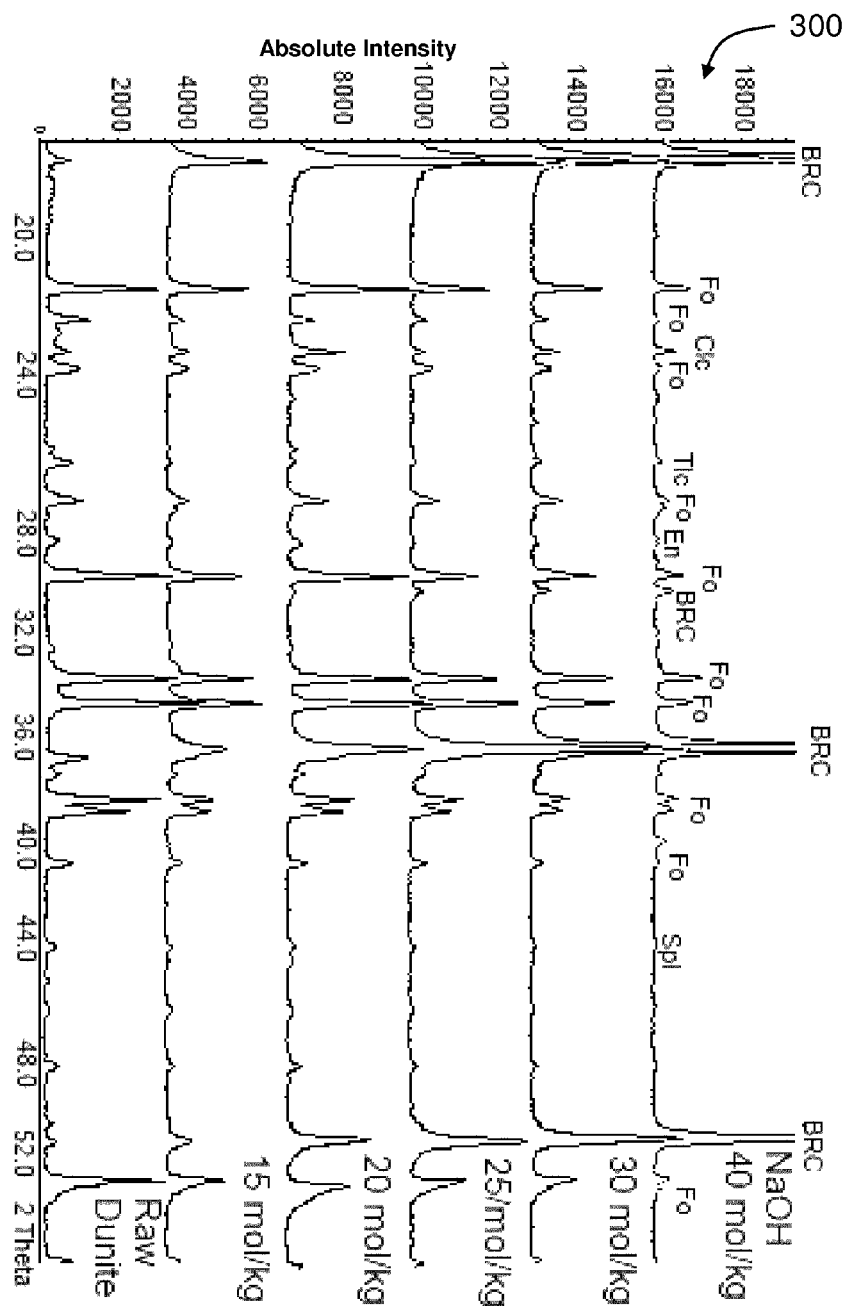
FIGS. 3a and 3b are illustrations of XRD patterns of selected samples, wherein solid products from dissolution of Dunite, namely a form of Olivine, using Sodium Hydroxide (NaOH) solution of concentration in a range of 15 to 40 mol/kg (left), and using Sodium Hydroxide (NaOH) solution of concentration 50 mol/kg (right) solutions. In the illustrations, following abbreviations are employed: Fo=Forsterite, Brc=Brucite, Clc=Clinochlore, En=Enstatite, Srp=Serpentine, Tlc=Talc, Spl=Spinel.
Figure 3B:
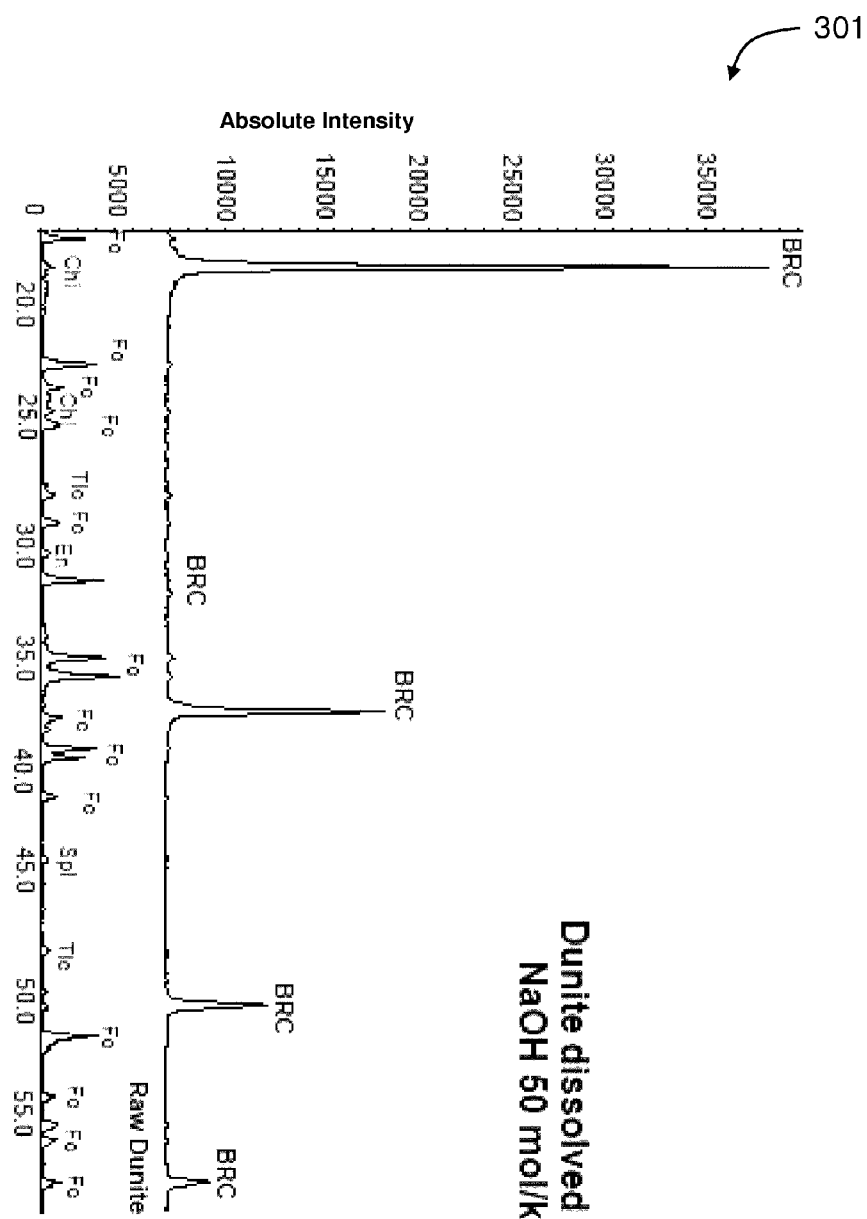
Figure 4A:
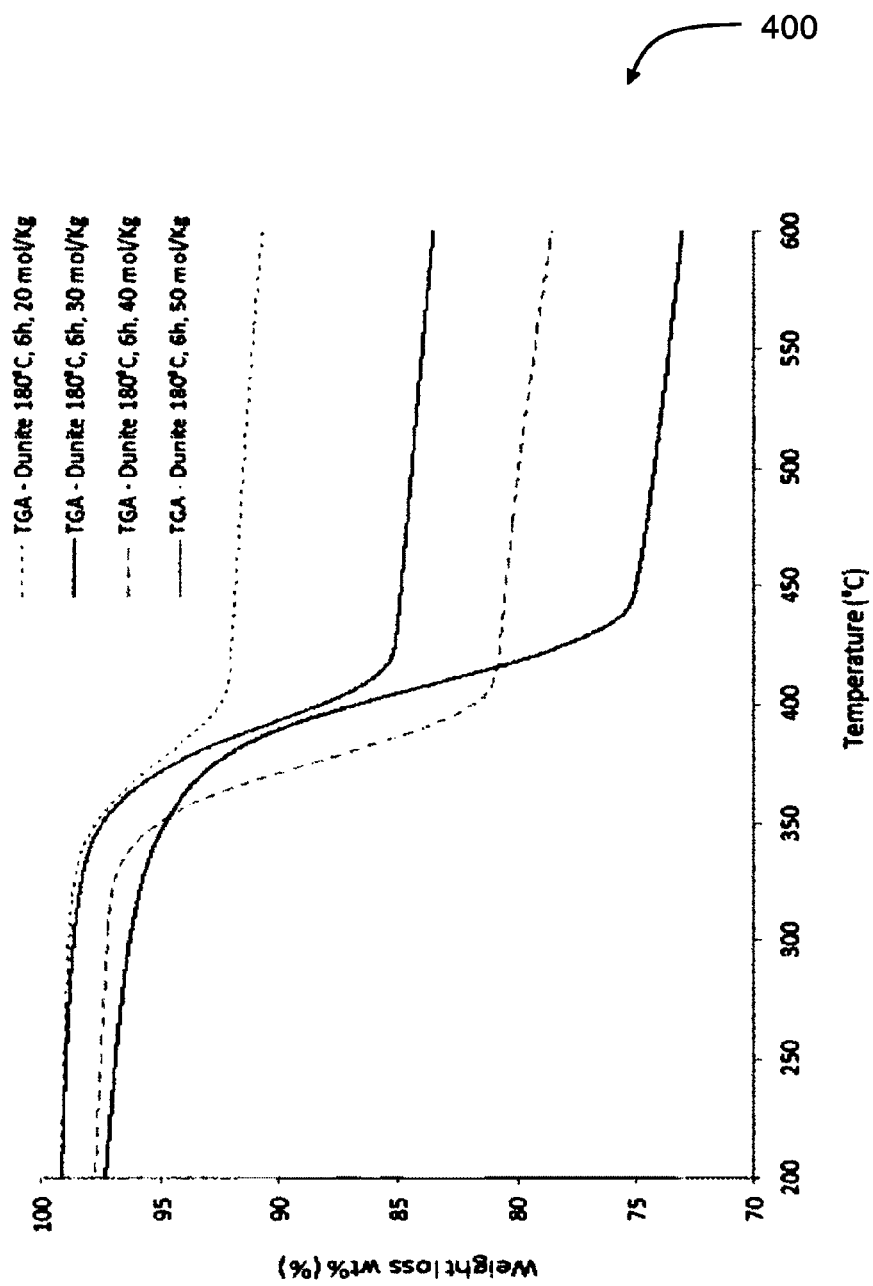
FIGS. 4a and 4b are illustrations of TG (4a) and DTG (4b) curves of selected samples: solid products from dissolution of Dunite at a temperature of 180° C. for 6 hours with different concentrations of Sodium Hydroxide (NaOH) solution.
Figure 4B:
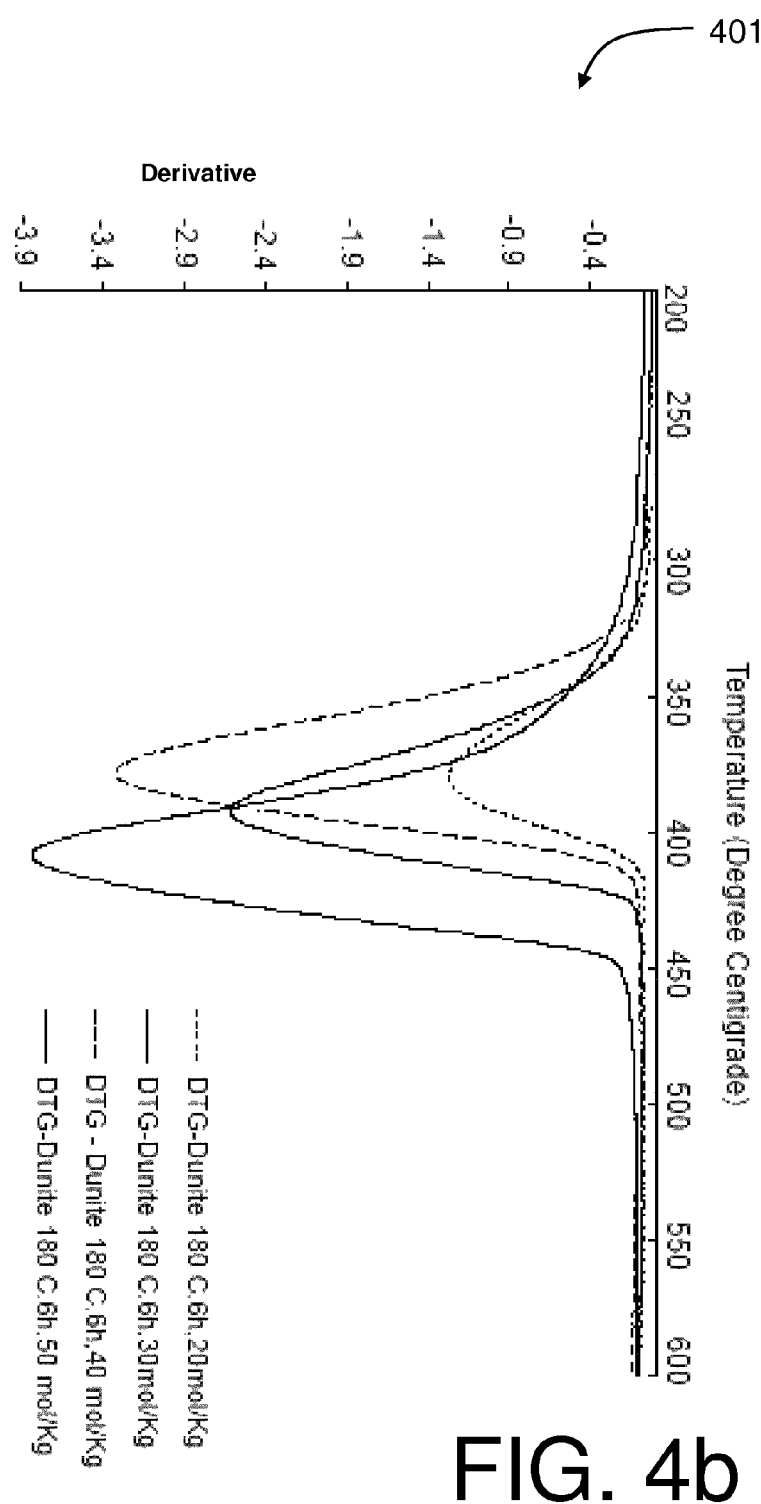
Figure 5:
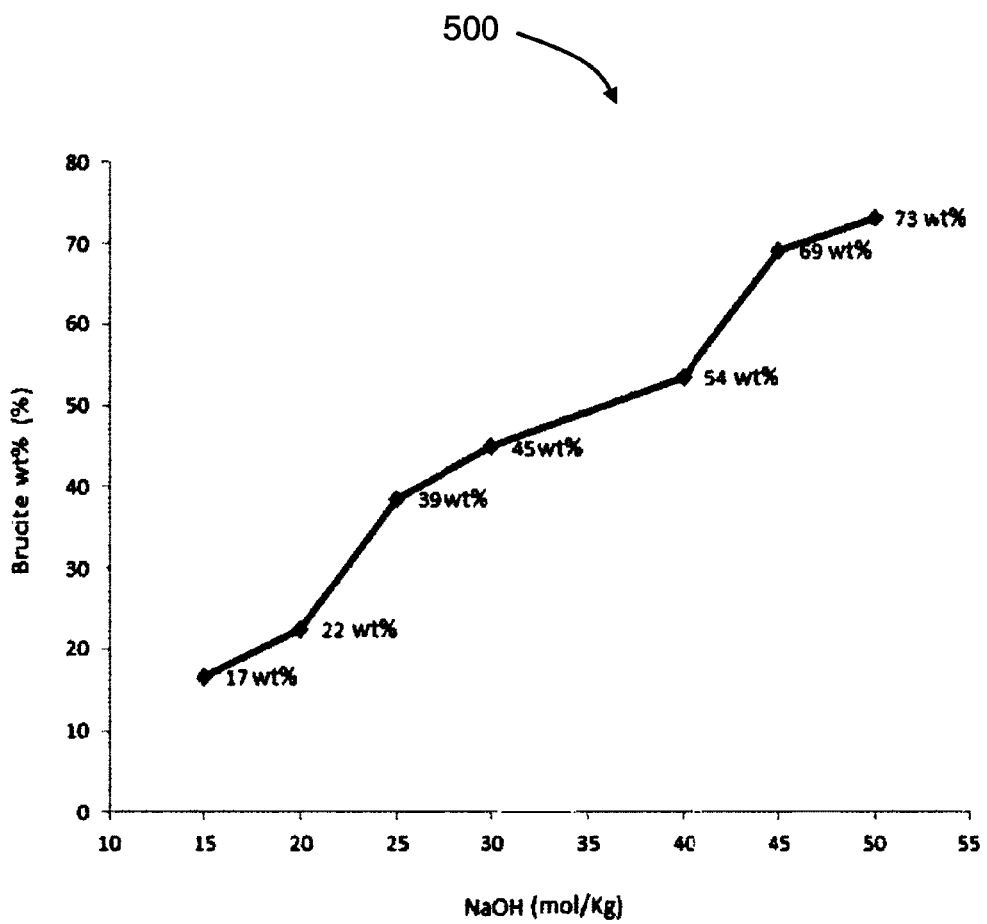
FIG. 5 is a graph wherein there are shown $M_g(OH)_2$ concentrations in solid products based on TG results: Dunite dissolved at a temperature of 180° C. with different concentrations of Sodium Hydroxide (NaOH) solution, namely measured as moles of NaOH per kg of water. From the graph, it will be appreciated that the proportion of Dunite, namely magnesium silicate, converted to Brucite, namely magnesium hydroxide, increases approximately linearly with increase in NaOH concentration; extrapolation of this graph indicates that the proportion of Brucite in the solid product should approach 100% above a NaOH concentration >70 mol/kg, namely equivalent to a NaOH:H2O ratio >1.26.
Figure 6:
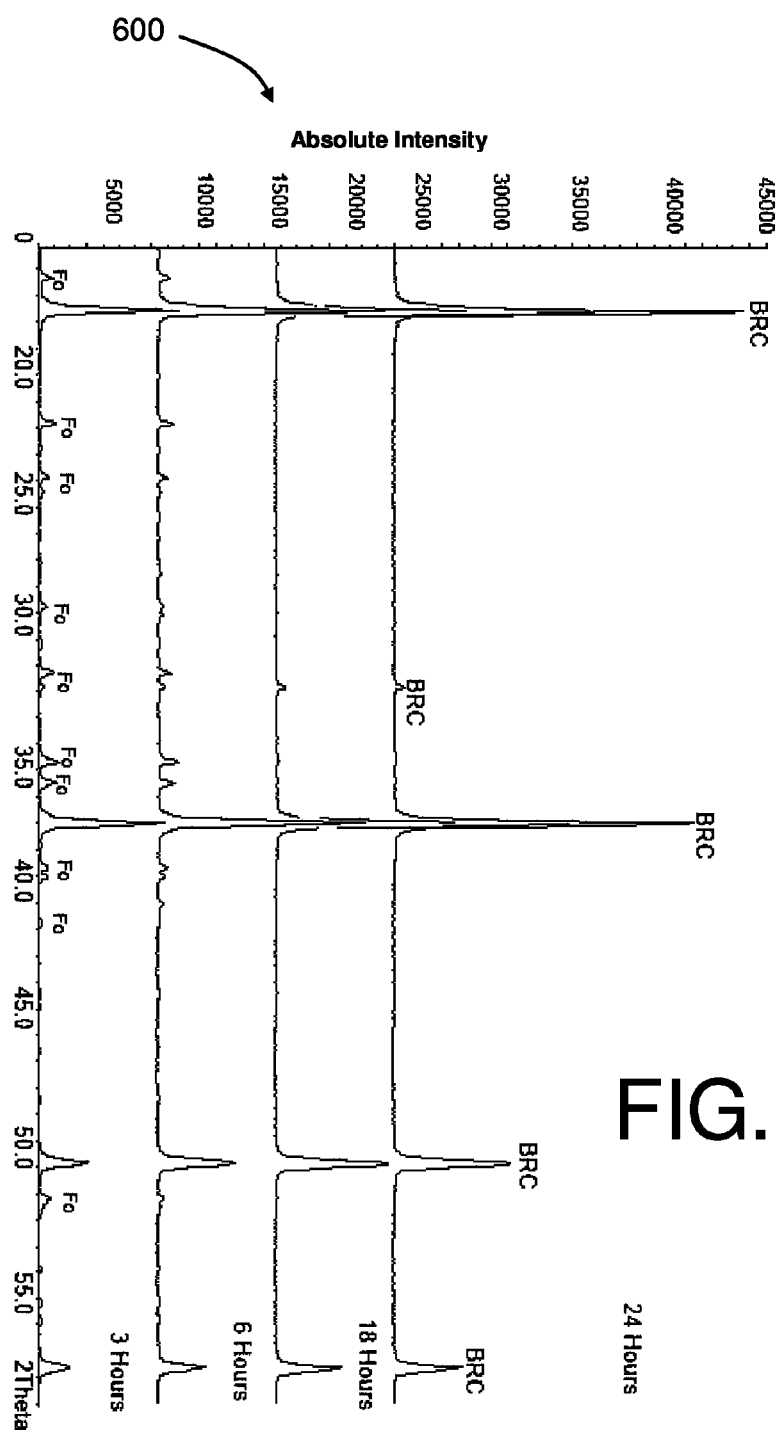
FIG. 6 is an illustration of XRD patterns of solid products from dissolution of Dunite at 180° C. with Sodium Hydroxide (NaOH) solution having a molar concentration of 40 mol/kg solution, for different temporal durations.
Figure 7A:
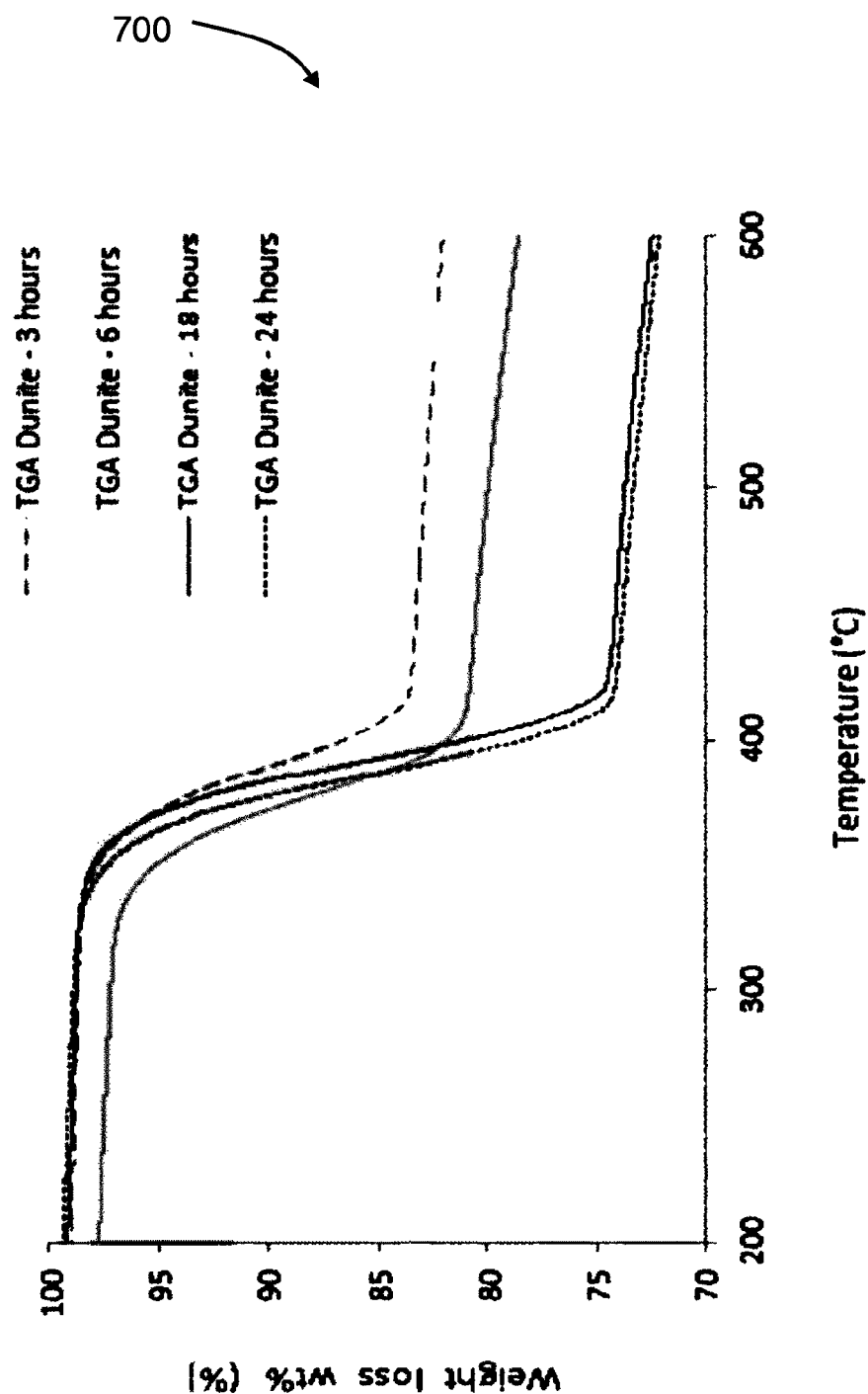
FIGS. 7a and 7b are illustrations of TG (7a) and DTG (7b) curves of solid products from dissolution of Dunite at a temperature of 180° C. with Sodium Hydroxide (NaOH) solution having a molar concentration of 40 mol/kg for different temporal durations.
Figure 7B:
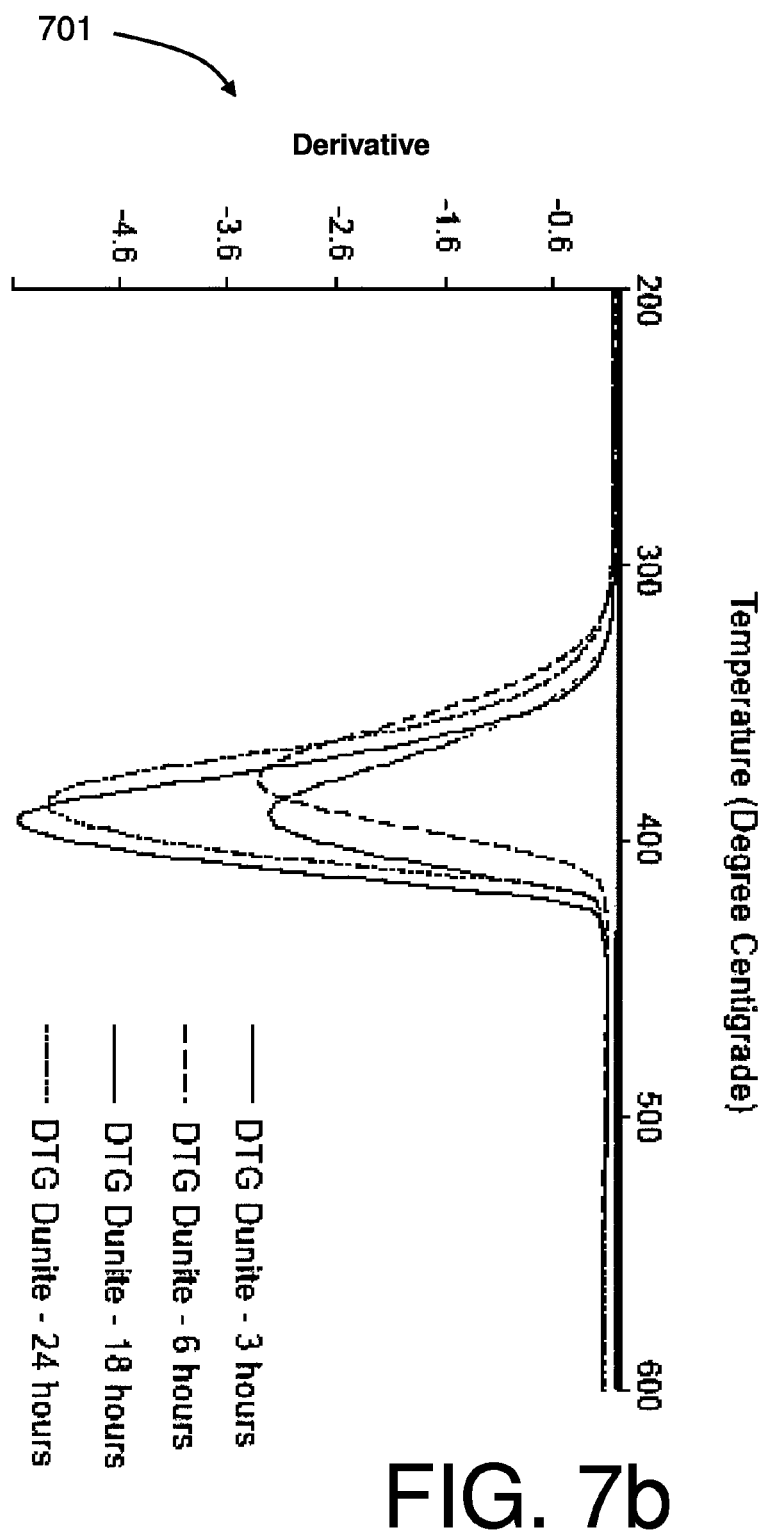
Figure 8:
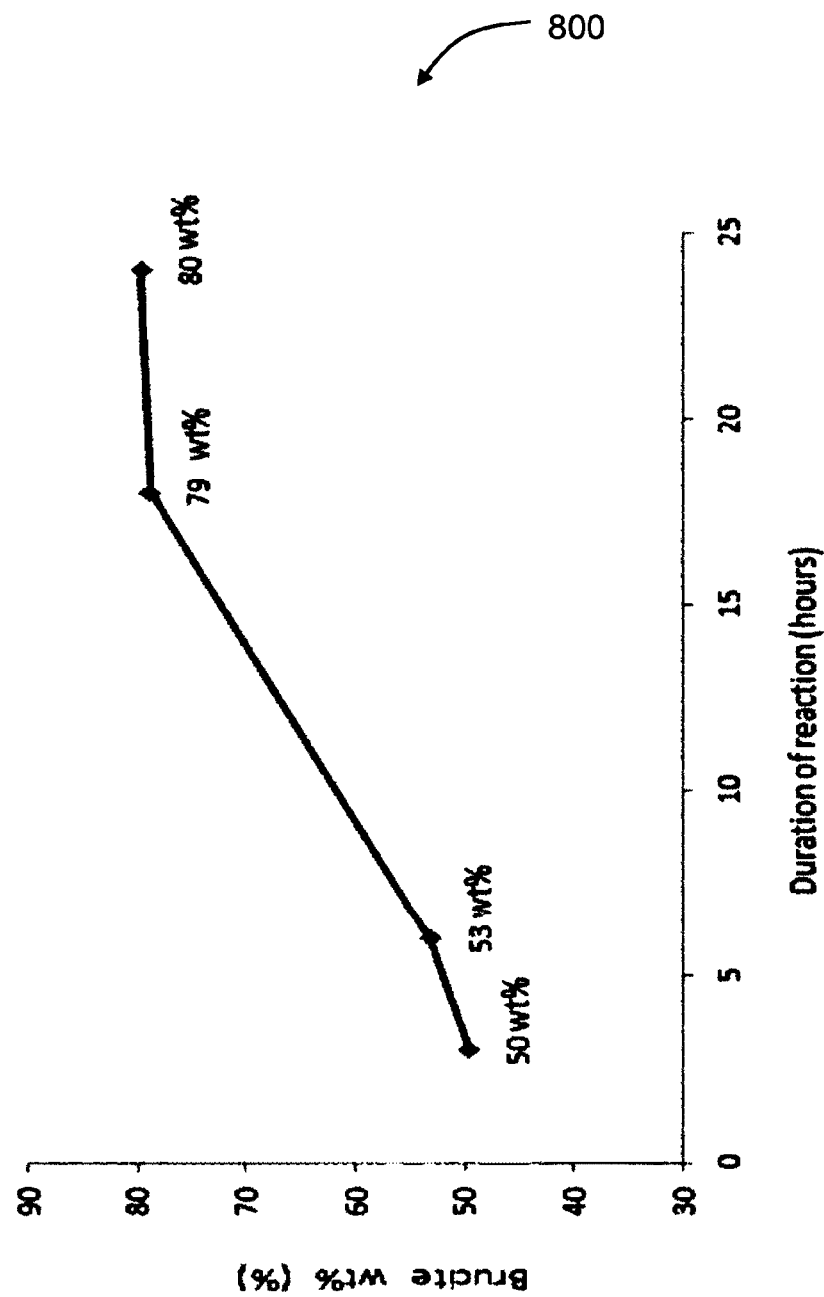
FIG. 8 is a graph in which there is shown Magnesium Hydroxide $Mg(OH)_2$ concentration in solid products based on TG results: Dunite dissolved at a temperature of 180° C. with a molar concentration of Sodium Hydroxide (NaOH) solution being 40 mol/kg for different durations.
Figure 9:
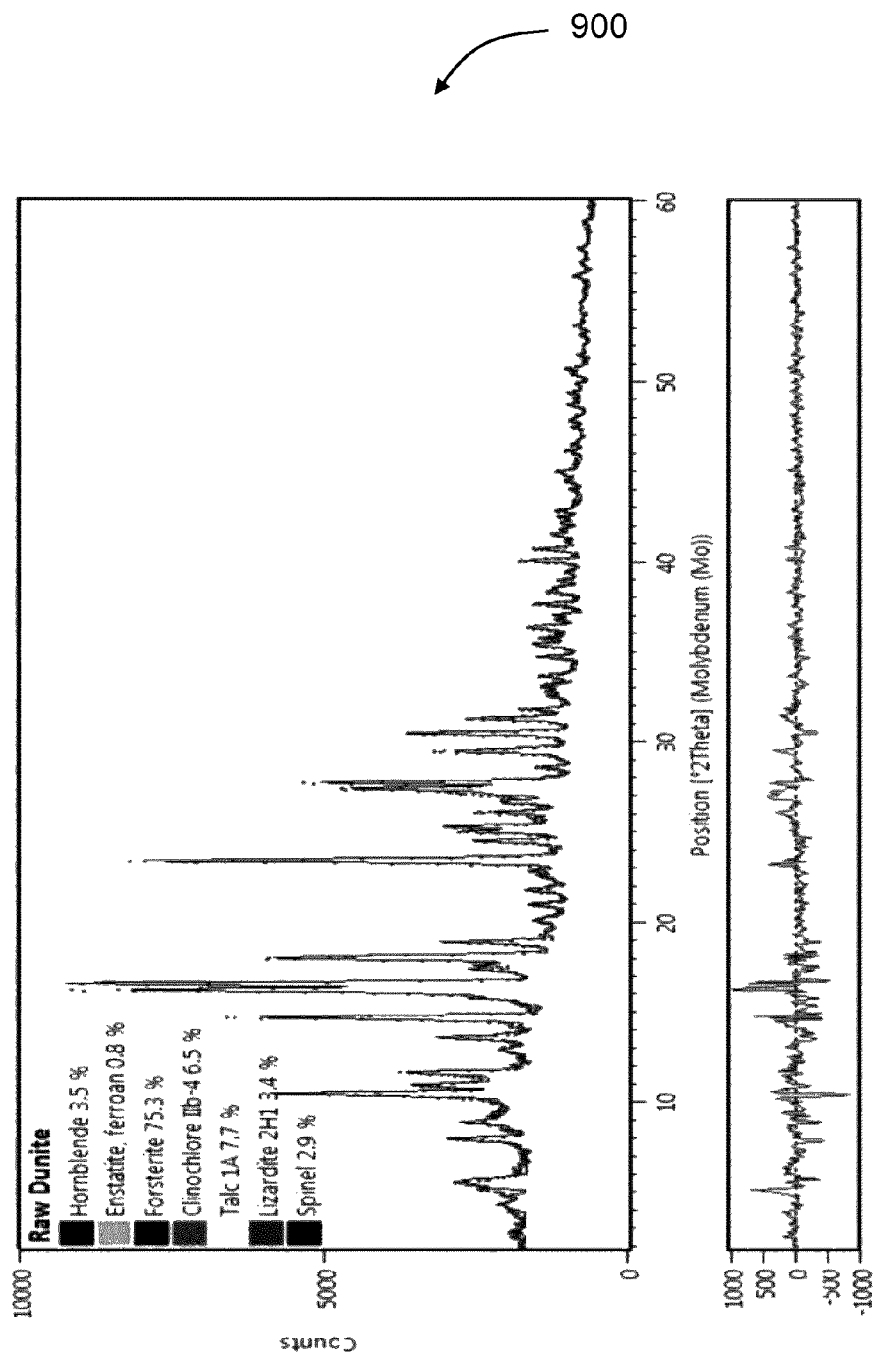
FIG. 9 is an illustration showing Rietveld Refinement QPA of raw Dunite, wherein: data points profile= experimental pattern; continue profile=calculated model (above); difference plot (below)
Figure 10:
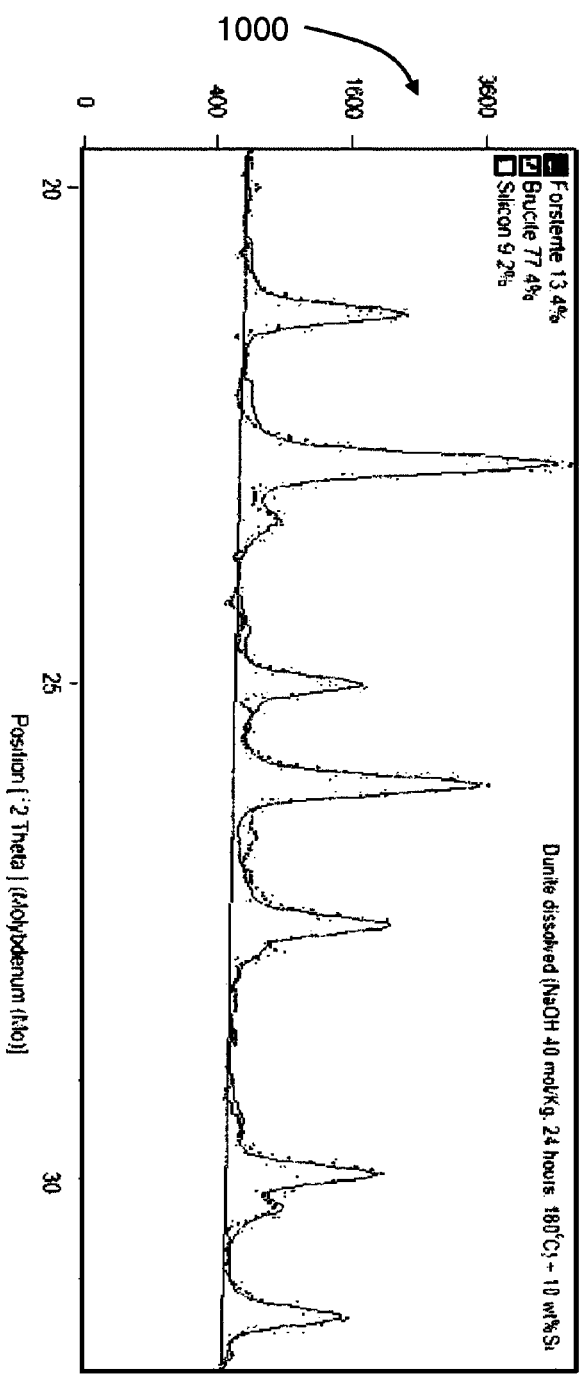
FIG. 10 is an illustration showing Rietveld Refinement QPA of dissolved Dunite spiked with 10 wt % Silicon, wherein: data points profile=experimental pattern; continue profile=calculated model.
Figure 11A:
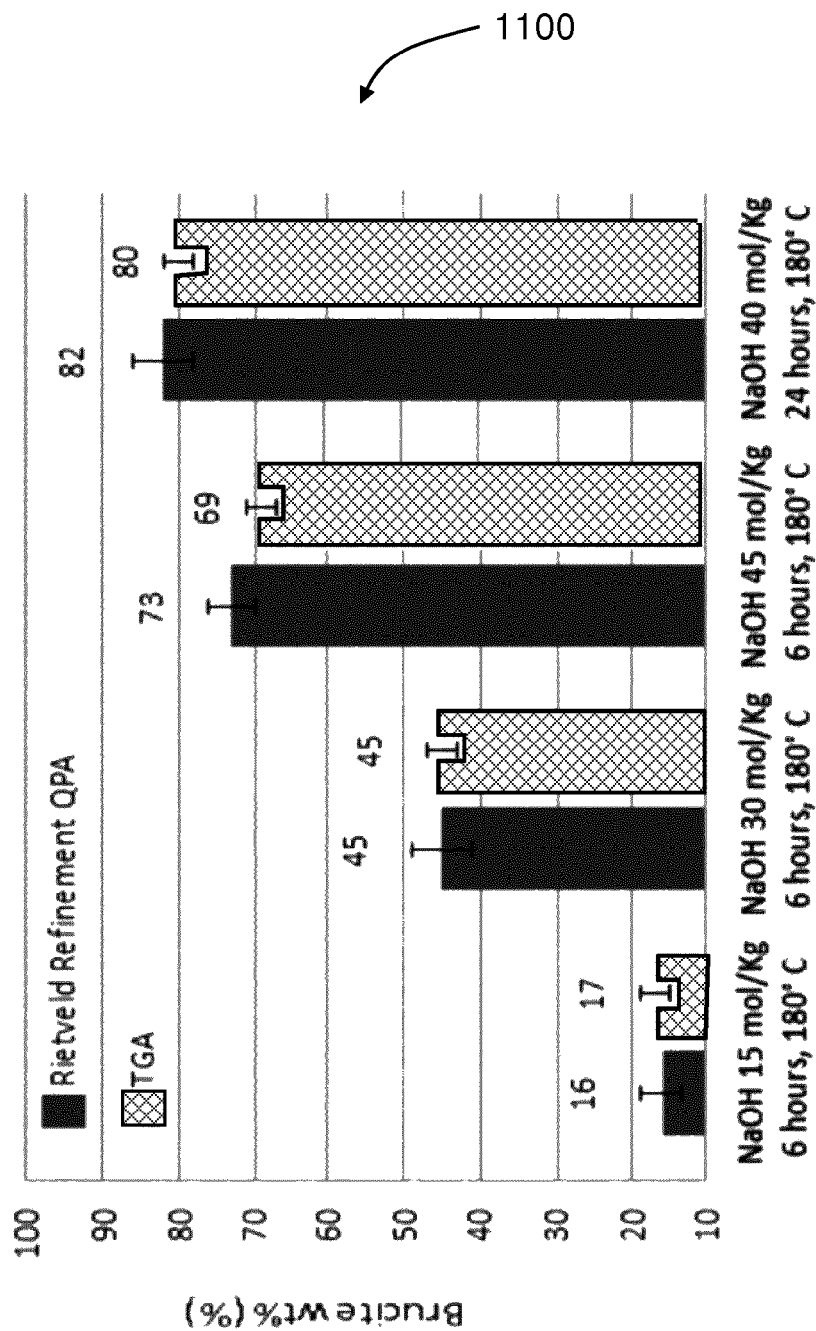
FIGS. 11*a* and 11*b* are illustrations showing Brucite quantification with Rietveld Refinement and TGA (FIG. 11*a*), wherein Forsterite and Brucite concentrations were obtained via Rietveld Refinement QPA of selected samples (FIG. 11*b*).
Figure 11B:
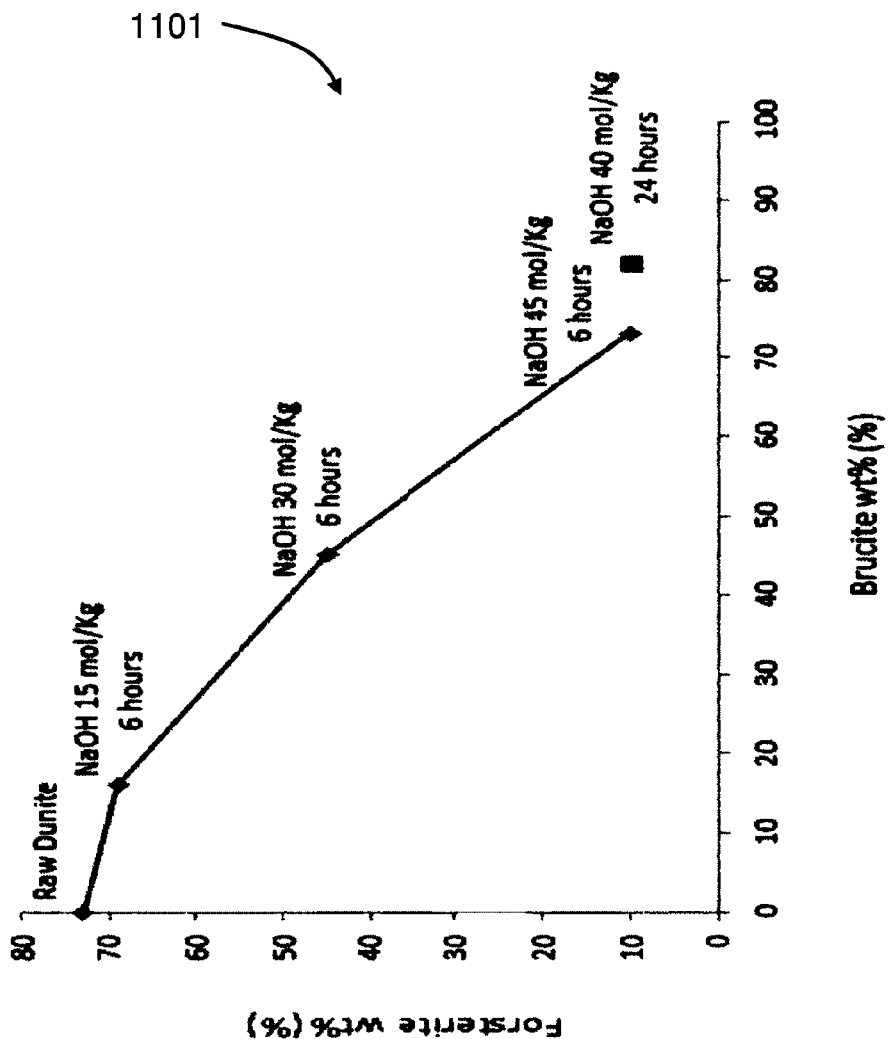

In contrast, results of experiments, as provided in FIGS. 3*a*, 3*b*, 5, with aqueous NaOH and Olivine show that minimum reaction conditions of a temperature of 180° C. and a NaOH concentration of 40 mol/kg are substantially required to form magnesium hydroxide; this aqueous system requires a pressure vessel to reach a required reaction temperature.

For the case of Dunite samples, comparison of the results cited above with alkaline digestion of Dunite with 50 mol/kg NaOH aqueous system at 180° C. under a similar time period, show that the yield of $Mg(OH)_2$ via solid state reaction (55% to 62%) was on a par with that produced using the aqueous system (between 58% and 66%). The alkaline digestion with 50 mol/kg NaOH required significantly more NaOH per 1 gram of Dunite processed such that the solid state reaction effected a 97% to 99% reduction of NaOH consumption. Additional experimental results comprising Dunite as a sample component are detailed later.

Generally stated, it has been demonstrated that it is possible to extract $Mg(OH)_2$ from magnesium containing silicate minerals via solid state reaction with NaOH and that the consumption of the alkaline reactant can be reduced, achieving significant yield of reaction. An additional advantage is the reduction of water consumption which would be needed for an aqueous process.

Moreover, results have also shown, namely in FIG. 5, that the extent of conversion to magnesium hydroxide is approximately linearly proportional to the NaOH concentration, approaching approximately 80%. Without water, the NaOH concentration (mol/kg) effectively approaches infinity and might therefore be expected to approach 100% conversion of magnesium silicate to magnesium hydroxide. Compared to the aqueous reaction system, as exemplified by Blencoe, clear benefits of the non-aqueous dry-mixture and stoichiometric system using Serpentine are that:
(i) no pressure vessel is required;
(ii) melting and mixing surprisingly take place at 180° C., to enable a rapid reaction at a rate similar to an aqueous system;
(iii) a highest possible concentration and activity of NaOH is enabled, leading to a faster and more complete reaction than possible in an aqueous system at a similar temperature;
(iv) the NaOH is totally consumed in a reaction with silicate to form solid sodium silicate, so that no subsequent process for recovery of excess NaOH from the reaction products is required;
(v) Serpentine provides any water required for the stoichiometric conversion to magnesium hydroxide from its structural hydroxide groups, so that no free water needs to be added to the reaction system;
(vi) the products of reaction, containing no excess NaOH, are a solidified glass which is substantially less caustic than in the aqueous process and are therefore much safer to handle;
(vii) sodium silicate is readily separated from the products of reaction by dissolution and filtration, and is available without contamination by NaOH; and
(viii) the process can be more readily and cheaply carried out at remote Serpentine or Olivine mine sites where water may not be available.

Further, in the prior art of Blencoe it is described how the the initial step (a) can be conducted at a pressure slightly below the vapour pressure of pure water for the temperature of that step. Blencoe does not claim a preferred temperature or pressure or aqueous solution composition for that initial step (a), but in a table of experimental results shows that all reactions in which serpentine or olivine are converted to a major phase of brucite are done in aqueous solution in a pressure vessel at a temperature of 200 C and pressure <15 atm. One experiment conducted at a temperature of 22 C and 1 atm pressure for 72 hrs results in conversion to a minor phase of brucite; subsequent additional reaction at 200 C and <15 bar then converts substantially to brucite with a minor residual phase of serpentine. Notwithstanding Blencoe's assertion of the technological and commercial advantage of avoiding pressure-intensifying equipment, at the effective reaction temperature of 200 C for Blencoe's step (a), the vapour pressure of pure water is just above 15 bar indicating that a pressure vessel must be used in this step. The current invention allows for the method and system to operate without expensive and complicated equipment used in Blencoe to operate at higher than atmospheric pressure.

In the example of magnesium carbonates being produced according to the described method, a wide range of compounds including soluble magnesium bicarbonate $Mg(HCO_3)_2$ is produced in solution, but generates no separate water in the carbonation reaction:

The preferred alkali 103 for this digestion process is beneficially Sodium Hydroxide or Potassium Hydroxide, together with water ($H_2O$). It is also possible to use Sodium Carbonate, Sodium Bicarbonate, Potassium Carbonate and Potassium Bicarbonate as the alkali for the digestion process. The heat source 104 is employed to raise a temperature of the digestion process, whilst stirring of the mixture is implemented, to a temperature of less than 250° C., and for a temporal period of less than 6 hours. A preferred range of temperature is from 140° C. to 220° C. The reaction can be best performed with the temperature being less than 200° C., and most preferentially at around 180° C., throughout the process, as shown in the results FIG. 4 to FIG. 8. The digestion vessels used are most suitably Teflon (PTEE) to withstand hot-conc-NaOH with the maximum operating temperature usually specified at 220° C. Experiments with Magnesium silicate mineral feedstocks have been showing excellent results for this process. Other alkaline earth silicates such as calcium silicate and wollastonite are also suited for the preferred process.

This digestion process is preferably carried out at a pressure of less than 20 Bar, wherein 1 Bar corresponds to nominal atmospheric pressure at sea-level. The reaction can be more preferably carried out at a pressure less than 10 Bar. The reaction can be further more preferably be carried out at pressure conditions lower than the vapour pressure of pure water at the temperature of reaction. The benefit of not having to use high pressure vessels to carry out hydrothermal reactions saves cost and also improves the applications of the technology in industrial applications at very high volumes and large scale installations.

The process, after digestion of Olivine, is shown in equation 112. Here, the Brucite ($MgOH_2$) 107, solid phase, is separated from a Silicate solution 108, namely a liquid phase, prepared by adding water 106 to the reaction mixture. Thereafter, the Silica precipitation process is carried out as depicted in the equations 113 and 112. The process, namely acid precipitation, can be carried out by adding either Carbon Dioxide ($CO_2$) or acid 110. The excess alkali 111 is recovered and fed back to a chamber of the reactor 102. Performing the digestion process at ambient atmospheric pressure conditions avoids a need to employ equipment to increase pressure, for example an autoclave, and allows large scale, continuous sequestration of industrial Carbon Dioxide ($CO_2$) emissions to be achieved. Avoiding the requirement for any pressurised containment of the reaction steps, provides several benefits:
(i) much cheaper and simpler reaction vessels can be used;
(ii) it is easier and cheaper to incorporate mixing, stirring and/or particle attrition to enhance reaction rates within an unpressurised reaction vessel;
(iii) energy usage, namely energy wasted in pressurisation/depressurisation, is lower;
(iv) product throughput is faster, namely a need for time to pressurise is avoided; and
(v) while pressurised reaction systems tend to operate in batch mode, it is much easier to configure each step, and also the overall process, as a continuous operation in an unpressurised system.

Continuous operation is generally recognised by process engineers as preferable to batch operations because:
(a) reaction parameters such as temperature, pH and reactant concentrations are easier to maintain at fixed optimum levels; and
(b) residence times are shorter, thereby enabling process equipment to be smaller and cheaper and product throughput higher.

Figure 2:
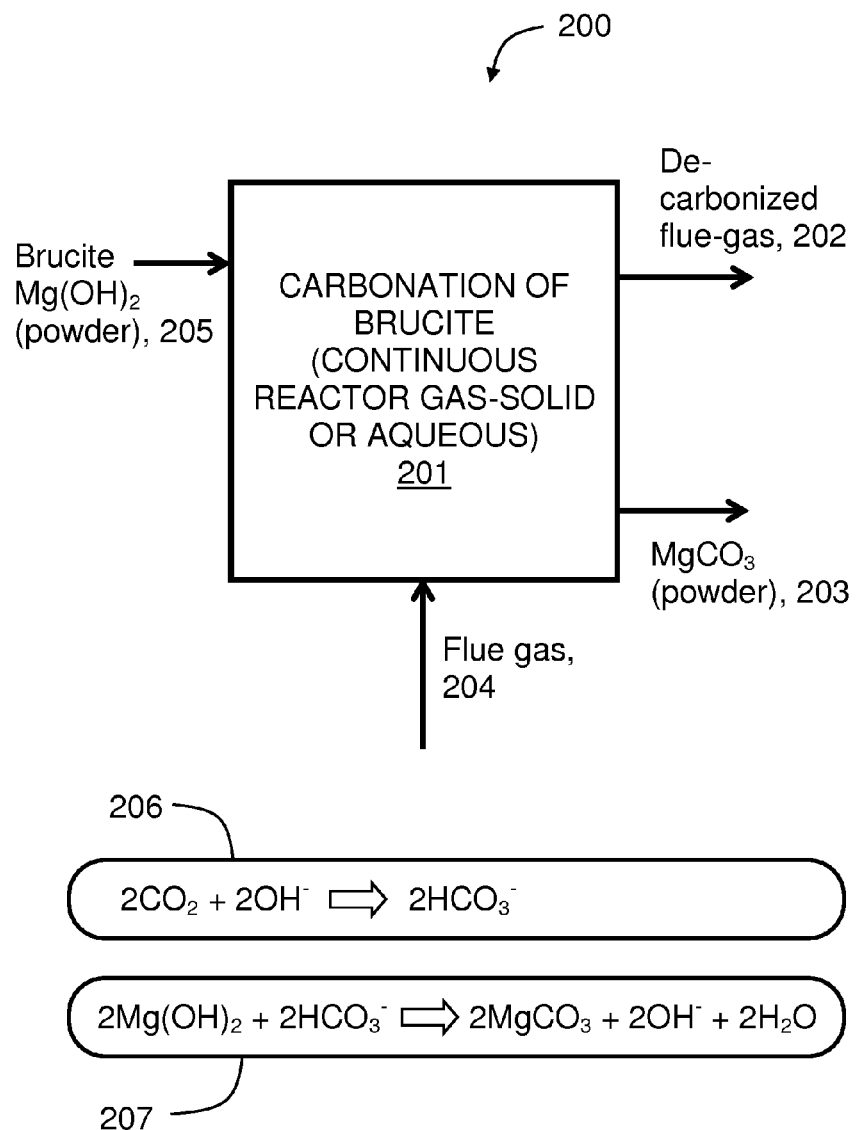
FIG. 2 is an illustration of a flow chart of a Carbonation step 2 involving direct Carbonation of Brucite, namely Magnesium Hydroxide, with flue-gas to form Magnesium Carbonate.

In FIG. 2, there is provided an illustration of the details of a Carbonation process 200 as also depicted in equations 206 and 207. The Brucite ($MgOH_2$) powder 205 is fed into a continuous reactor 201, together with a flue-gas 204. The de-carbonised flue gas 202 and Magnesium Carbonate (MgCO₃) powder 203 are the reaction products of this Carbonation process 200.

In a further embodiment of the present invention, Mg(OH)₂ (Brucite) powder is provided as added to water to form an aqueous suspension which is then used at ambient temperature and pressure to scrub $CO_2$ from a gaseous mixture of nitrogen ($N_2$) and $CO_2$. The scrubbing process using wet-Brucite which simultaneously removes the $CO_2$ from the gas mixture and converts the Brucite to magnesium carbonates. Substantial removal and conversion can be achieved such that most, if not all, of the $CO_2$ is taken out of the gas mixture and most, if not all, of the Brucite is converted.

Following a particular example of such a further embodiment of the invention, consider the following experiment:

A gas mixture of (nitrogen) $N_2$ containing 4-5% $CO_2$ (carbon dioxide, cylinder pre-mix) was bubbled continuously at a fixed flow-rate (around 2.25 liters/minute) through a fixed circulating volume (around 10 liters) of water (pre-saturated before the experiment with 5% $CO-N_2$) containing a suspension of magnesium hydroxide powder (0.871 mol, 50.8 grams). The $CO_2$ concentration in the exit gas was initially zero (as it was totally removed by reaction with Brucite) and was monitored as the suspended Brucite particles were consumed in the reaction to form dissolved magnesium bicarbonate. Periodic samples of the circulating liquid were taken to monitor change in pH and magnesium ion concentration. The experiment was concluded when the concentration of $CO_2$ in the exit gas had increased to equal that of the inlet concentration, indicating that no further reaction was occurring. The experiment took approximately 12 hours to complete and was run over the course of two days with an overnight shut-down.

A Down-flow Gas Contactor (DGC, WRK Design & Services Ltd) with a liquid volume of around 10 liters was used as the gas-liquid reactor. In this reactor, the gas-mixture at atmospheric pressure entered at the top of a bubble column, entrained in a downward circulating liquid flow. The rate of liquid recirculation in the DGC reactor (around 10 liters/min) was adjusted to maintain a stable bubble-liquid interface. The $CO_2$-depleted gas exited from the bottom of the column after reaction and separation from the recirculating liquid phase. Gas flow rate was measured by calibrated glass tube rotammeter at a fixed 2.25 liters/minute (atmospheric pressure). Concentration of $CO_2$ was measured using a calibrated inline infrared datalogger (range: 0-5% $CO_2$ measured to nearest 0.25%). Temperature was ambient, in a range of 9.5-11° C. Solution pH was in a range of pH 8.2-8.9.

The DGC reactor provides a large and dynamic interfacial area between gas bubbles and circulating liquid. During the course of the experiment, $CO_2$ dissolves from the gas (g) into the liquid (l) phase (or aqueous phase, aq) and reactions occur with the suspended Brucite particles (solid phase being labelled as s):

$$CO_2(g) = CO_2(aq) \quad (E1)$$

$$CO_2(aq) + H_2O(l) = H_2CO_3-(aq) \quad (E2)$$

$$H_2CO_3(aq) = H+(aq) + HCO_3-(aq) \quad (E3)$$

$$HCO_3-(aq) = H+(aq) + CO_3 2-(aq) \quad (E4)$$

$$Mg(OH)_2(s) = Mg_2+(aq) + 2OH-(aq) \quad (E5)$$

$$Mg(OH)_2(s) + CO_2(aq) = MgCO_3(s) + H_2O(l) \quad (E6)$$

$$Mg(OH)_2(s) + 2CO_2(aq) = Mg_2+(aq) + 2HCO_3-(aq) \quad (E7)$$

$$Mg_2+(aq) + CO_3 2-(aq) = MgCO_3(s) \quad (E8)$$

$$MgCO_3(s) + CO_2(aq) = Mg_2+(aq) + 2HCO_3-(aq) \quad (E9)$$

In alkaline solution, Brucite solubility is well known to be negligible while $CO_2$ dissolves readily. In the pH range of the experiment, pH falls in the range 8.2-8.9, the predominant form of carbon in solution is the bicarbonate ion, $HCO_3-(aq)$. The dominant reactions in this situation may therefore be expected to be:

$$CO_2(g) + H_2O(l) = H+(aq) + HCO_3-(aq) \quad (E10)$$

And $$Mg(OH)_2(s) + 2H+(aq) = Mg_2+(aq) + 2H_2O(l) \quad (E11)$$

At higher pH, where carbonate ions dominate, the formation of solid magnesium carbonate phases would be expected and, moreover, may precipitate on the surface of the suspended Brucite particles, blocking the Brucite to further reaction with $CO_2$. At lower pH, dissolution of $CO_2$ would be inhibited. However, at pH 8-9, where bicarbonate ions are greatly in excess of carbonate ions, formation of solid magnesium carbonate phases should be minimal, with the result that suspended Brucite particles should fully react with $CO_2$, ideally in a mole ration of 1:2, to form an aqueous solution of magnesium bicarbonate.

Figure 12A:
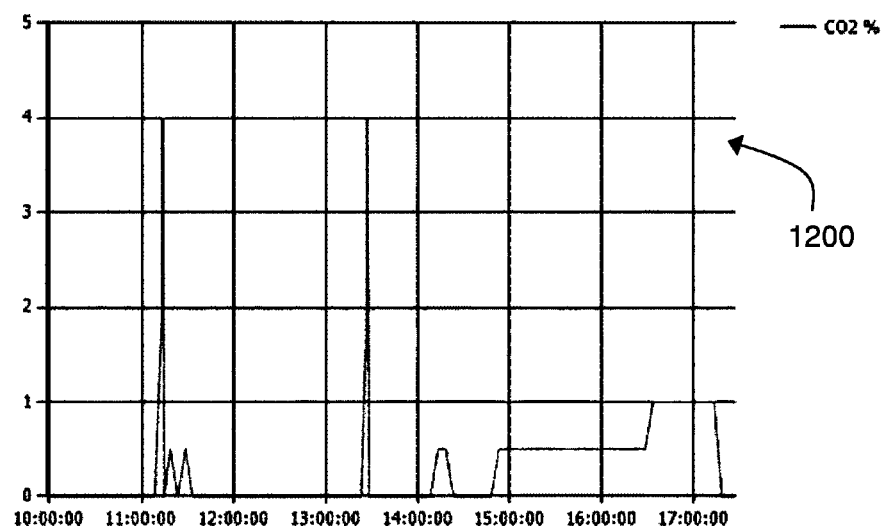
FIGS. 12*a* and 12*b* depict experimental data concerning the removal of $CO_2$ by means of Brucite powder in aqueous suspension, specifically the resulting $CO_2$ level for a monitored exit gas after processing.
Figure 12B:
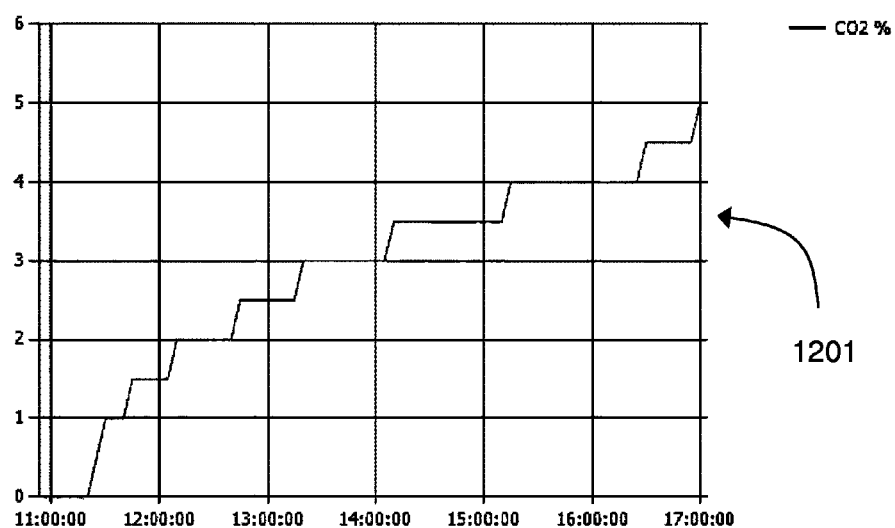

$CO_2$ concentrations in exit gas were data-logged continuously. Occasional measurements of (fixed) inlet $CO_2$ concentration were taken. The resulting data is shown in the two charts: one for day 1 detailing results 1200 (FIG. 12a) and one for day 2 detailing results 1201 (FIG. 12b), showing $CO_2$ concentration (% $CO_2$) versus time.

Analysis: The total amount of $CO_2$ removed from the inlet gas is calculated from the measured gas flow-rate and the measured difference between inlet and outlet gas concentration:

$$CO_2(moles) = \text{flow-rate (liters/min)} \times ([\% CO2]in - [\% CO2]out)/22.4 \text{ (liters/mole)} \times \text{time (min)} \quad (E12)$$

Uncertainty in the flow-rate measurement (rotameter) is estimated from rotameter specifications as 3%. The $CO_2$ meter was able only to measure to the nearest 0.5% in a $CO_2$ concentration range of 0-5%. Additionally the inlet gas $CO_2$ concentration from the pre-mix cylinder was measured at different times in the experiment as 4% and 5%. Absolute uncertainty in the measured % $CO_2$ concentration change is estimated at 0.7% $CO_2$.

The total amount of $CO_2$ removed from the inlet gas during the 12 hour course of the experiment was measured as 1.87 moles (±0.2 moles). Within experimental error, this is the amount of $CO_2$ expected to be removed if all 0.871 moles of the initial Brucite had reacted with $CO_2$ to form dissolved magnesium bicarbonate according to reaction (E7) above. Within the limits of measurements errors, results show that 100% utilisation (carbonation) of Brucite is feasible when wet-scrubbing 5% $CO_2-N_2$ gas mixture.

Results also show that for the first 3.5 hours of the 12 hour experimental period, removal of $CO_2$ from the inlet 5% $CO_2-N_2$ gas mixture was 100%. Over the first 6 hrs (first day), $CO_2$ removal averaged 93% and over the full 12 hours averaged 62%. Results show unequivocally that a Brucite-water suspension can fully scrub $CO_2$ from dilute gas mixtures.

It may be expected that in a future industrial $CO_2$ scrubbing system, in which the rates of water, Brucite and $CO_2$ addition may be controlled to maintain pH within a range of around pH8 to pH9, and where magnesium bicarbonate is removed, continuous removal of $CO_2$, controllable up to 100%, should be possible and/or simultaneous with up to 100% conversion of Brucite to magnesium carbonates.

In a preferred embodiment, Olivine 101 is mixed with NaOH 103 and water 106 in a mole ratio in the range of 1:(1-6):(0-5). The mixture is reacted at 180° C.-220° C. in a stirred PTFE vessel at a pressure <10 bar to produce a solid mixture 102. Cooling and removal of resulting solid reaction mixture from reaction vessel is followed by separation of Brucite powder from the reaction mixture by dissolving the soluble fraction of the reaction mixture in water and filtering the resulting suspension 108. The Brucite powder 205 is dispersed in water and a flue-gas 204 containing $CO_2$ sparged into the Brucite dispersion to form a dispersion of magnesium carbonate 203 and to remove $CO_2$ from the flue-gas 202.

In an alternative embodiment, it is preferred to capture Carbon Dioxide ($CO_2$) directly from low-Carbon Dioxide ($CO_2$) flue-gases at a less than ca 50 vol % Carbon Dioxide ($CO_2$). This flue-gas mixture is used for the carbonation step and more typically 3-25 vol % Carbon Dioxide ($CO_2$) has also been used during carbonation. This is much more cost effective than using previously captured and separated pure Carbon Dioxide ($CO_2$) which often also is pressurised. Experiments have shown that approx. 75% of energy costs in conventional Carbon Capture and Storage (CCS) processes are attributed to the Carbon Dioxide ($CO_2$) capture and/or separation. The use of the proposed mineral carbonation process offer the possibility of direct reaction with the dilute, low-pressure Carbon Dioxide ($CO_2$) in unseparated flue-gases, at atmospheric pressure and thereby saving energy. In the prior art, it is taught that the reaction of $CO_2$ with mineral feedstocks is preferably carried out at substantial pressures, and certainly much higher than the ambient partial pressures of $CO_2$ prevailing in flue-gases. Typically, the extent of carbonation of the mineral feedstock in these cases is in the range of 3% to 80%. Surprisingly, it is found, pursuant to the present disclosure, that it is possible substantially to react completely in ambient unpressurised conditions the $CO_2$ contained in flue-gases, and even in air, with a water-suspension of the magnesium hydroxide derived from magnesium silicate. Such a reaction would be expected to terminate as soon as the outer surfaces of the predominantly insoluble mineral particles have reacted to form carbonate, leaving the vast majority of mass of the magnesium hydroxide un-reacted. However, pursuant to the present disclosure, it is found that it is possible to execute the aqueous carbonation reaction in a continuous mode, so that the magnesium hydroxide is totally carbonated. Advantages of such an aqueous, ambient pressure continuous carbonation system, compared to prior art approaches, such as described by Blencoe, are several, namely:

much higher carbonation efficiencies can be achieved;
  flue gases can be treated directly without expensive separation of $CO_2$ or pressurisation;
  useful and much higher-value precipitated carbonate powder by-products can be generated; and
  compared to carbonation of the silicate mineral or of the reaction mixture, the use of magnesium hydroxide directly in unpressurised aqueous carbonation also enables the carbonation step to be more easily separated from the earlier steps of the overall process, and to be performed at a different time and place.

Referring to "unpressurized" mentioned in the foregoing, it is optionally feasible to vent apparatus for implementing embodiments of the present disclosure directly to ambient atmosphere, namely substantially 1 Bar pressure, thereby avoiding a need for using expensive pressure vessels. However, optionally, embodiments of the present disclosure are operated in a substantially unpressurized manner at pressures in a range of 0.5 Bar to 10.0 Bar, more optionally in a range of 0.8 Bar to 5.0 Bar, and yet more optionally in a range of 0.9 Bar to 2.0 Bar. It will be appreciated that "pressurized", in contradistinction, refers to pressures, for example, in excess of 20 Bar, in excess of 50 Bar, or even in excess of 100 Bar.

For example, the first steps of the process in which a mined magnesium silicate mineral is converted into magnesium hydroxide can be carried out at the mine site, while, without a need for elevated temperatures or pressures for reaction, the final step in which $CO_2$ in flue-gas reacts with aqueous magnesium hydroxide, can be carried out at a distant source of $CO_2$ emissions, such as a power station or on board a ship. Moreover, compared with magnesium silicate or the reaction mixture, magnesium hydroxide, having a lower molar mass and being able to react more completely with $CO_2$, has a much higher $CO_2$ sequestration capacity, namely tonnes of $CO_2$ stored per tonne of magnesium hydroxide that is carbonated; this means that less material needs to transported and used to sequester the same mass of $CO_2$ and, therefore, less energy and cost is expended in transport and handling tasks. In an alternative embodiment, in which magnesium hydroxide powder is replaced with magnesium silicate powder in water slurry, it is surprisingly found, pursuant to the present disclosure, that it is also possible to achieve substantial direct aqueous-phase carbonation of Serpentine and Olivine powders, and substantial scrubbing of $CO_2$ from ambient pressure flue gas. The prior art teaches that substantial and direct carbonation of Serpentine or Olivine powders is only possible under energy-intensive and costly conditions of elevated temperature or pressure, or with intense pre-processing, or with chemical additives. Pursuant to the present disclosure, it is found that high-efficiency and low-cost direct carbonation of Serpentine and Olivine can be achieved at ambient pressures and temperatures with only water or seawater and $CO_2$ as additives in a simple carbonation reactor system. The $CO_2$ can be pure or dilute, as in flue-gas or even in air, and at any partial pressure or temperature. In an embodiment of the present disclosure, there is injected simulated flue gas, namely a mixture of $CO_2$ and $N_2$, into a circulating slurry of the mineral powder in water and also in seawater. Many alternative gas-liquid mixing arrangements are possible, such as spraying of droplets solution of slurry into the gas. Similarly, many alternative arrangements for solids-liquid mixing are possible, such as a fixed or stirred bed, or column of mineral particles through which water or brine is circulated to dissolve the mineral. By controlling a rate at which $CO_2$ and/or mineral and/or water and/or energy are added or removed to/from the system, it was surprisingly found that conditions can be maintained in which the magnesium silicate mineral continuously dissolves and the $CO_2$ is continuously scrubbed from the gas. Measurements of water containing Serpentine powder demonstrate an alkaline pH above pH8, and even above pH9. Serpentine and Olivine and other related magnesium silicate minerals such as chrysotile, lizardite, antigorite, and forsterite are composed of alternating crystal layers of magnesium oxide/hydroxide and silica. It is believed that the mechanism by which the magnesium silicate mineral dissolution and carbonation is possible under such mild conditions is that a suitable pH in the range of pH8 to pH9 is maintained by the addition of $CO_2$, such that successive crystal layers of magnesium hydroxide dissolve directly into solution to form a solution of magnesium bicarbonate. In this pH range, carbonate ion concentration in solution is orders or magnitude lower than bicarbonate ion concentration and the formation of passivating solid magnesium carbonate phases on the surface of magnesium silicate particles is therefore avoided. Dissolution of the magnesium oxide layers is likely to destabilise the successive silica layers in the magnesium silicate crystal, so that the silica dissolves or precipitates as a solid, possibly accelerated by surface attrition due to stirring or solution circulation. The advantages pertaining to this surprising beneficial result of being able to carbonate magnesium silicate mineral powders, namely without any pre-processing other than mining and crushing operations, directly under ambient conditions with just water and dilute $CO_2$ are several, namely:

(i) magnesium silicate mineral powders are much cheaper as feedstocks for carbonation than magnesium hydroxide, or thermally or chemically activated magnesium silicate mineral powers;
(ii) carbonation can potentially be carried out directly at a huge scale at the site of the magnesium silicate mineral deposit using the $CO_2$ available in air, or $CO_2$ piped to the site, and with recirculation of water no additional water supply is needed;
(iii) recovery and separation of pure $CO_2$ gas and pure solid magnesium carbonate from the bicarbonate solution by conventional ageing, thermal or pressure-swing processes can provide compatibility with other $CO_2$ transport, storage or utilisation options;
(iv) separation of pure solid magnesium carbonate from bicarbonate solution provides a saleable chemical and industrial feedstock for other processes;
(v) separation of silica solids from the dissolution/disintegration of the magnesium silicate mineral provides a further saleable industrial feedstock; and
(vi) Nickel and Iron and other minor elemental constituents typically present in magnesium silicate minerals and wastes may be released in the process and can potentially be economically recovered from solution or by purification of the solid products.

The efficiency of this entire process as illustrated in FIG. 1 and FIG. 2 has been analysed through various scalability experiments, wherein it has been found that, for the Magnesium-mineral Silicates, the alkaline treatment is attractive as the associated Carbonation reaction is chemically favorable at a higher pH resulting in a higher reaction rate:

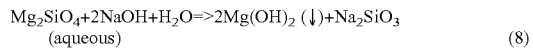

$$Mg_2SiO_4 + 2NaOH + H_2O \Rightarrow 2Mg(OH)_2 (\downarrow) + Na_2SiO_3 \text{(aqueous)} \quad (8)$$

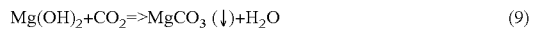

$$Mg(OH)_2 + CO_2 \Rightarrow MgCO_3 (\downarrow) + H_2O \quad (9)$$

In one of the embodiments, it is feasible to convert Dunite, an ultramafic rock rich in Magnesium-bearing minerals, into Magnesium Hydroxide ($Mg(OH)_2$) by using highly concentrated Sodium Hydroxide (NaOH) aqueous solutions. The effect of the reaction time and the Sodium Hydroxide (NaOH) solution concentration on the process were studied to determine optimal conditions for achieving higher rate of conversion of Magnesium-mineral Silicates into Magnesium Hydroxide ($Mg(OH)_2$). The product phases were identified by XRD and TG analysis. Careful quantification of Forsterite and Brucite both in raw materials and products were performed using Rietveld Refinement QPA and TG. The experimental results have been illustrated in the FIGS. 3a and 3b, FIGS. 4a and 4b, FIG. 5, FIG. 6, FIGS. 7a and 7b, FIG. 8, FIG. 9, FIG. 10, FIGS. 11a and 11b; these results are indicated by 300, 301, 400, 401, 500, 600, 700, 701, 800, 900, 1000, 1100, 1101 respectively. The experimental results of these drawings have been briefly elucidated in the foregoing.

The tests conducted have shown that Magnesium-mineral Silicates constituting Dunite can be almost completely substituted with Brucite in highly concentrated solutions of Sodium Hydroxide (NaOH) and heated to a temperature of substantially 180° C. According to the experimental results, increasing the Sodium Hydroxide (NaOH) concentration and the time of reaction are both factors that positively affect the conversion of Magnesium-Silicates into Magnesium Hydroxide. A greater amount of Magnesium Hydroxide ($Mg(OH)_2$) was produced by using either a solution of Sodium Hydroxide (NaOH) having a molar concentration of 50 mol/kg for a temporal duration of 6 hours (73 wt %), or by using a solution of Sodium Hydroxide (NaOH) having a molar concentration of 40 mol/kg for a temporal duration of 18 and 24 hours (79-80 wt %). The TGA analyses results were found to be in accordance with the qualitative XRD results and with the Rietveld Refinement Quantitative Phase Analysis.

During our exploration of optimal experimental conditions for different embodiments of the Olivine-NaOH reaction, we have discovered that it is possible to achieve substantial conversion of Olivine to Brucite in open vessels at ambient atmospheric pressure while heating to temperatures in the range 130-220 C. At these elevated temperatures the vapour pressure of water significantly exceeds the reaction pressure. This discovery provides a significant advantage over the processes described by prior art systems in that the reaction can be conducted at much lower pressures (and even at ambient atmospheric pressure) using standard low-cost industrial reactors that typically are designed to withstand operating pressures up to 10 bar.

In accordance with another embodiment of the present invention, compacted Dunite powder can be heated in a sealed vessel at a temperature around 180° C., preferably for around six hours, to produce a product comprising Brucite.

In accordance with another embodiment of the present invention, the Olivine and/or Serpentine is a Magnesium mineral which are suitable feedstock materials due to their high content of Magnesium (Mg) and wide abundance and large concentration in mineralogical sites.

From the above description and claimed process, it will be appreciated that there is provided an improved process of alkali digestion for mineral Carbonation. The process can find utility in sequestration of Carbon Dioxide ($CO_2$), extraction of valuable minerals, and other processes, known to the person skilled in the art, requiring the digestion of minerals for their Carbonation.

Optionally a method of sequestrating Carbon Dioxide ($CO_2$), comprising:
reacting an alkaline earth silicate-based material with an alkali metal compound to form a mixture comprising a hydroxide of the alkaline earth, wherein the alkali metal is selected from sodium and/or potassium, and wherein the alkaline earth is selected from magnesium and/or calcium;
reacting the mixture at a temperature in the range 140-220° C. and at a pressure of less than 10 Bar;
separating the hydroxide of the alkaline earth from the mixture; and
combining the hydroxide of the alkaline earth with a source of Carbon Dioxide ($CO_2$) producing a Carbonate or Bicarbonate or the alkaline earth. This gives a very beneficial production and sequestration of the hydroxide of the alkaline earth.

Optionally, a method of sequestrating Carbon Dioxide ($CO_2$) as outlined above further includes reacting the mixture in (b) at a pressure of less than the vapour pressure of pure water at the temperature of reaction Optionally, a method of sequestrating Carbon Dioxide ($CO_2$) as outlined above further includes using the mixture with a stoichiometric ratio between the Si in the alkaline earth silicate-based material and the alkali metal in the alkaline compound in a range of 1:1 to 1:2.

Optionally, a method of sequestrating Carbon Dioxide ($CO_2$) as outlined above includes using the mixture in a form of an aqueous solution with the molality of >30 molar of alkaline compound per liter water ($H_2O$).

Optionally, a method of sequestrating Carbon Dioxide ($CO_2$) as outlined above includes reacting the mixture at ambient atmospheric pressure.

Optionally, a method of sequestrating Carbon Dioxide ($CO_2$) as outlined above includes executing the reaction at a temperature of ca 180° C.

Optionally, a method of sequestration Carbon Dioxide ($CO_2$) as outlined above includes using flue gases with less than 50 vol % Carbon Dioxide ($CO_2$) as part of a gas mixture for carbonation.

Optionally, a method of sequestrating Carbon Dioxide ($CO_2$) as outlined above includes carrying out reactions in an unpressurised continuous mode to achieve substantially complete carbonation of the Magnesium Hydroxide or Magnesium silicate.

Optionally, a system for sequestrating Carbon Dioxide ($CO_2$), wherein the system includes a first reaction chamber which is operable to receive a Silicate-based material and an alkaline compound, and a blending apparatus for blending contents of the first reaction chamber to produce a mixture therein.

Optionally, the system for sequestrating Carbon Dioxide ($CO_2$) as described above is operable to execute the method outlined above method of sequestrating Carbon Dioxide ($CO_2$).

Modifications to embodiments of the invention described in the foregoing are possible without departing from the scope of the invention as defined by the accompanying claims. For example the compound in the reaction may be selected from any one or combination of Hydroxide, Carbonate, and/or Bicarbonate as would be suitable to the person skilled in the art. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A method for activation of magnesium silicate minerals by conversion to magnesium hydroxide, comprising:
    a. mixing a dry powder of magnesium silicate rock with a dry powder of alkali metal hydroxide to form a dry solid-solid mixture with a molar ratio in the range of 1-3 moles of alkali metal per mole of silicon in the mixture;
    b. heating the dry solid-solid mixture to a temperature below 300 C in an unpressurised vessel for less than 4 hours to form a solid glass product predominantly comprising a mixture of magnesium hydroxide and alkali metal silicate; and
    c. dissolving the solid glass product in aqueous solution to form an alkaline aqueous liquid slurry, comprising solid and aqueous phase products.

2. The method as claimed in claim 1, further comprising reacting the aqueous solution phase products at atmospheric pressure with a gas comprising 0.04%-100% $CO_2$.

3. The method as claimed in claim 1, further comprising separating the alkaline aqueous liquid slurry into solid and aqueous solution phase products.

4. The method as claimed in claim 3, further comprising reacting the aqueous phase products at atmospheric pressure with a gas comprising 0.04%-100% $CO_2$.

5. The method as claimed in claim 4, wherein the gas includes air.

6. The method as claimed in claim 4, wherein the gas includes an industrial flue gas.

7. The method as claimed in claim 3, further comprising mixing the solid phase product with water and reacting at atmospheric pressure with a gas comprising 0.04%-100% $CO_2$.

8. The method as claimed in claim 7, wherein the gas includes air.

9. The method as claimed in claim 7, wherein the gas includes an industrial flue gas.

10. The method as claimed in claim 1, wherein the alkali metal includes a hydroxide or a carbonate of sodium or potassium.

11. The method as claimed in claim 1, wherein the magnesium silicate rock includes a serpentine or an olivine rock.

12. The method as claimed in claim 1, wherein the unpressurized vessel is heated to a temperature in the range 140 C-220 C.

13. The method as claimed in claim 1, further comprising continuously mixing the magnesium silicate mineral and alkali metal compound together allowing continuous reacting thereof and removing the solid glass product.

14. The method as claimed in claim 1, wherein the molar ratio comprises substantially 2 moles of alkali metal per mole of silicon.

* * * * *